United States Patent
Teranishi et al.

(10) Patent No.: US 10,949,016 B2
(45) Date of Patent: Mar. 16, 2021

(54) DISPLAY DEVICE INCLUDING AN ELECTRODE OVERLAPPING A FRAME AREA OUTSIDE THE DISPLAY AREA

(71) Applicant: Japan Display Inc., Tokyo (JP)

(72) Inventors: Yasuyuki Teranishi, Tokyo (JP); Yoshiharu Nakajima, Tokyo (JP)

(73) Assignee: Japan Display Inc., Tokyo (JP)

( * ) Notice: Subject to any disclaimer, the term of this patent is extended or adjusted under 35 U.S.C. 154(b) by 92 days.

(21) Appl. No.: 15/872,422

(22) Filed: Jan. 16, 2018

(65) Prior Publication Data
US 2018/0217711 A1 Aug. 2, 2018

(30) Foreign Application Priority Data
Jan. 30, 2017 (JP) .............................. JP2017-014472

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04101* (2013.01); *G06F 2203/04107* (2013.01); *G06F 2203/04108* (2013.01)

(58) Field of Classification Search
None
See application file for complete search history.

(56) References Cited

U.S. PATENT DOCUMENTS

| | | | | |
|---|---|---|---|---|
| 2013/0127779 A1* | 5/2013 | Lillie | .................... | G06F 3/0416 345/174 |
| 2014/0043288 A1* | 2/2014 | Kurasawa | ............. | G06F 3/0412 345/174 |
| 2014/0118639 A1* | 5/2014 | Matsushima | ....... | G02F 1/13338 349/12 |
| 2014/0240620 A1* | 8/2014 | Chiu | .................... | G06F 1/1626 349/12 |

(Continued)

FOREIGN PATENT DOCUMENTS

| | | |
|---|---|---|
| JP | 2010-176297 A | 8/2010 |
| JP | 2015-018424 A | 1/2015 |

OTHER PUBLICATIONS

Definition of substrate, 2019, https://en.oxforddictionaries.com/definition/substrate, p. 1 (Year: 2019).*

(Continued)

*Primary Examiner* — Kirk W Hermann
(74) *Attorney, Agent, or Firm* — K&L Gates LLP

(57) ABSTRACT

According to one embodiment, a display device which displays an image in a display area based on a pixel signal is provided. The display device includes a first substrate, a second substrate opposed to the first substrate, a first electrode arranged in the first substrate and overlapping a frame area outside the display area, second electrodes arranged in the second substrate and overlapping the display area, and a touch detection driver configured to output a drive signal to the first electrode and detect contact or proximity of an object with the frame area based on electrostatic capacitance between the first electrode and the second electrodes.

11 Claims, 15 Drawing Sheets

(56) References Cited

U.S. PATENT DOCUMENTS

| | | | |
|---|---|---|---|
| 2015/0145802 A1* | 5/2015 | Yao | G06F 3/0416 345/174 |
| 2016/0018915 A1* | 1/2016 | Kuo | G06F 3/0416 345/173 |
| 2016/0178974 A1* | 6/2016 | Li | G02F 1/134336 345/174 |
| 2016/0179262 A1* | 6/2016 | Li | G06F 3/044 345/174 |
| 2016/0202813 A1* | 7/2016 | Lee | G06F 3/044 345/174 |
| 2016/0202831 A1* | 7/2016 | Kim | G06F 3/044 345/173 |
| 2016/0320886 A1* | 11/2016 | Kim | G06F 3/047 |
| 2018/0018029 A1* | 1/2018 | Lim | G06F 3/03545 |

OTHER PUBLICATIONS

Office Action for related Japanese Patent Application No. 2017-014472 dated Dec. 8, 2020. 5 pages.

* cited by examiner

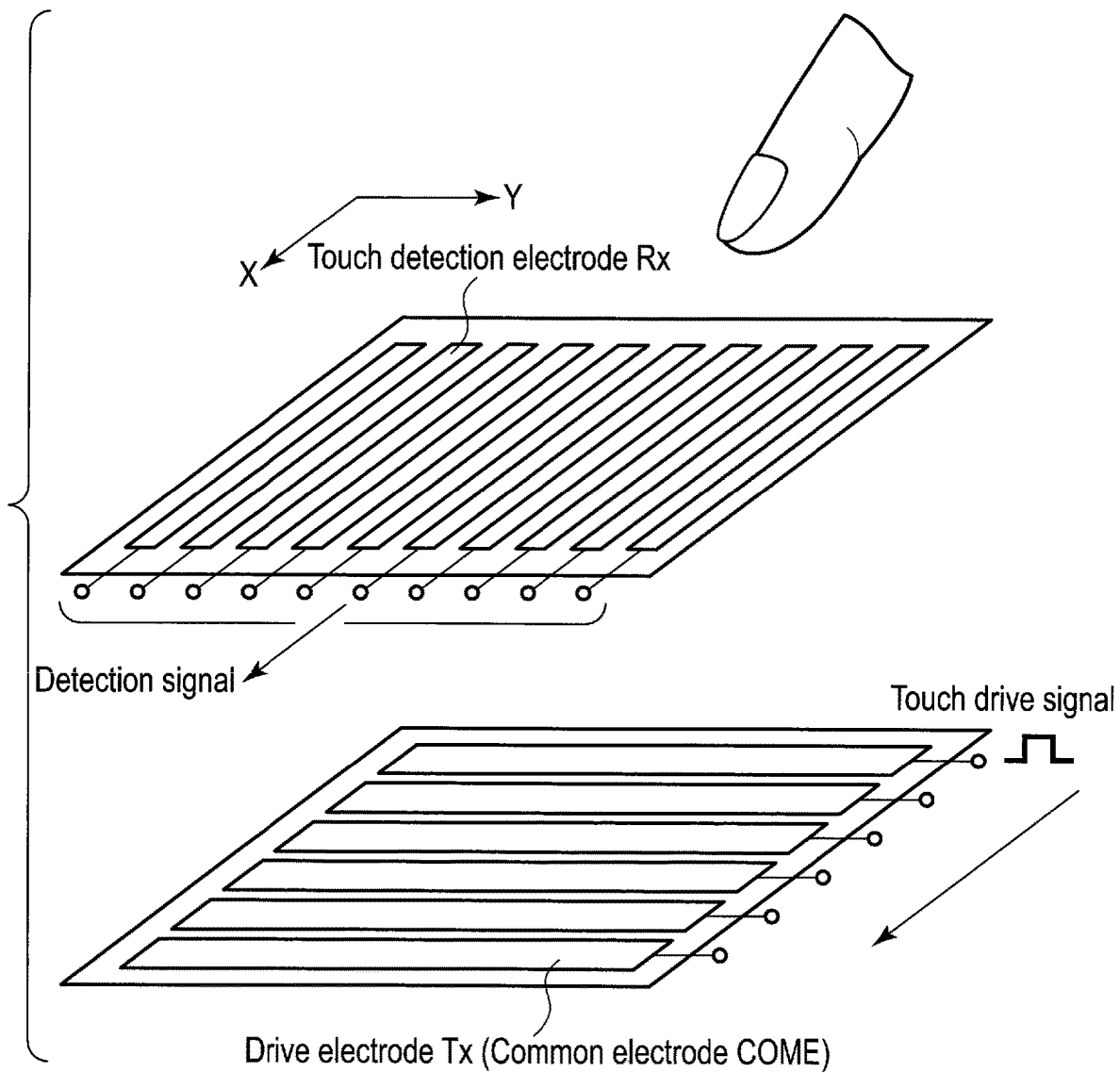
F I G. 3

DISPLAY DEVICE INCLUDING AN ELECTRODE OVERLAPPING A FRAME AREA OUTSIDE THE DISPLAY AREA

CROSS-REFERENCE TO RELATED APPLICATIONS

This application is based upon and claims the benefit of priority from Japanese Patent Application No. 2017-014472, filed Jan. 30, 2017, the entire contents of which are incorporated herein by reference.

FIELD

Embodiments described herein relate generally to a display device.

BACKGROUND

Recently, electronic devices such as smartphones and tablet computers have been widespread. Such an electronic device adopts a display device having a touch detection function (hereinafter referred to as a display device with a touch detection function).

The display device with the touch detection function can detect contact or proximity, etc., of an object (external proximal object) such as a finger or a pen, for example, with a display area (active area).

In the meantime, a frame area is provided around the display area of the display device with the touch detection function.

To effectively use the frame area, it is considered helpful to realize the touch detection function in the frame area and detect contact or proximity, etc., of an object also in the frame area.

SUMMARY

The present application generally relates to a display device.

According to one embodiment, a display device which displays an image in a display area based on a pixel signal is provided. The display device includes a first substrate, a second substrate opposed to the first substrate, a first electrode arranged in the first substrate and overlapping a frame area outside the display area, second electrodes arranged in the second substrate and overlapping the display area, and a touch detection driver configured to output a drive signal to the first electrode and detect contact or proximity of an object with the frame area based on electrostatic capacitance between the first electrode and the second electrodes.

BRIEF DESCRIPTION OF THE DRAWINGS

FIG. 3 is an explanatory diagram showing the basic operation of a touch detection mechanism.

DETAILED DESCRIPTION

Figure 1:
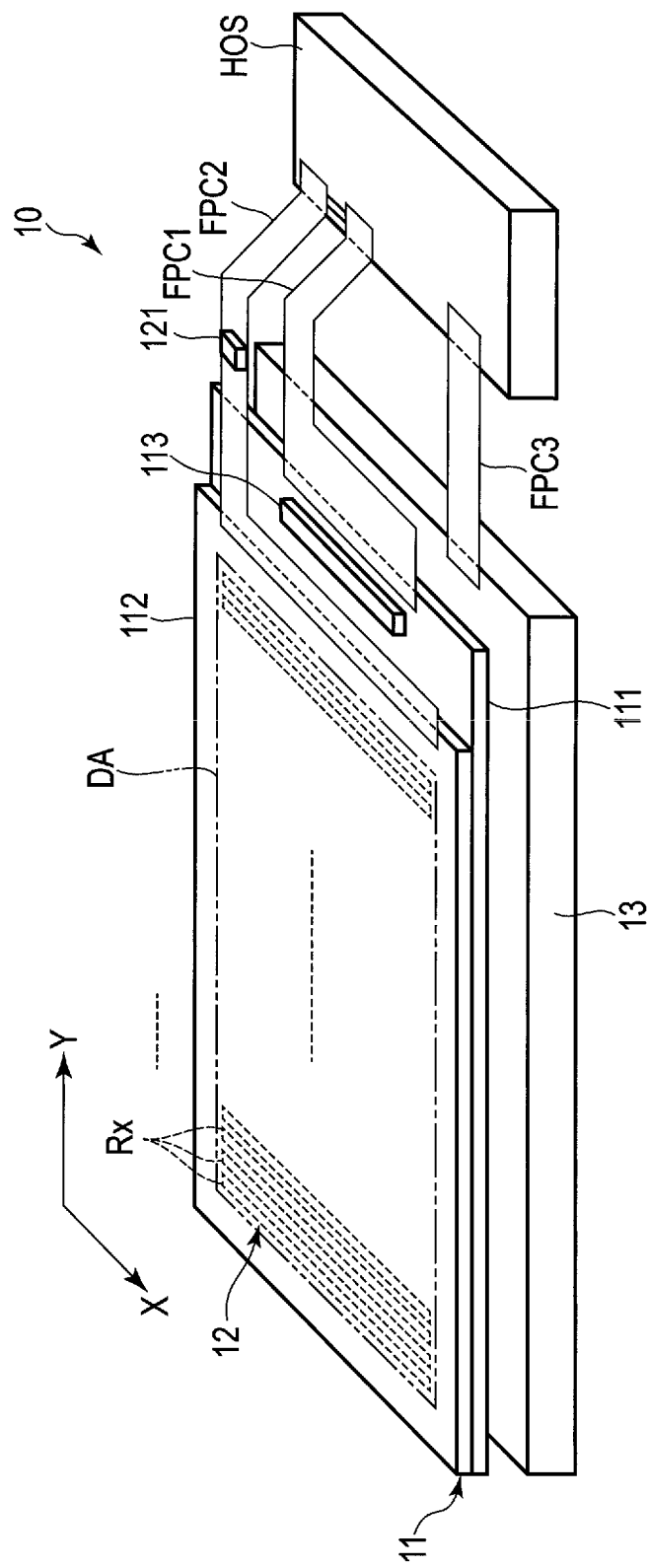
FIG. 1 is a perspective diagram schematically showing the structure of a display device of an embodiment.

An embodiment will be described hereinafter with reference to the accompanying drawings.

According to one embodiment, a display device which displays an image in a display area based on a pixel signal is provided. The display device includes a first substrate, a second substrate opposed to the first substrate, a first electrode arranged in the first substrate and overlapping a frame area outside the display area, a plurality of second electrodes arranged in the second substrate and overlapping the display area, and a touch detection driver configured to output a drive signal to the first electrode and detect contact or proximity of an object with the frame area based on electrostatic capacitance between the first electrode and the second electrodes.

The disclosure is merely an example, and proper changes in keeping with the spirit of the invention, which are easily conceivable by a person of ordinary skill in the art, come within the scope of the invention as a matter of course. In addition, in some cases, in order to make the description clearer, illustration is provided in the drawings schematically, rather than as an accurate representation of what is implemented. However, such schematic illustration is merely exemplary and in no way restricts the interpretation of the present invention. In the drawings, reference numbers of continuously arranged elements equivalent or similar to each other are omitted in some cases. In addition, in the specification and drawings, structural elements equivalent or similar to those described in connection with preceding drawings are denoted by the same reference numbers, and detailed description thereof is omitted unless necessary.

FIG. 1 is a perspective diagram schematically showing the structure of a display device according to the present embodiment. The display device according to the present embodiment is a display device with a touch detection function. The display device includes a display device having a touch detection mechanism referred to as an on-cell touch detection mechanism in which a touch panel is formed on the display surface of the display device, and a display device having a touch detection mechanism referred to as an in-cell touch detection mechanism in which a common electrode for image display which is originally provided in the display device is also used as one of a pair of electrodes for touch detection and the other electrode (touch detection electrode) is arranged in such a manner as to cross the common electrode. It the following description, the display device according to the present embodiment is assumed to have the in-cell touch detection mechanism.

A display device 10 shown in FIG. 1 includes a display panel 11. The display panel 11 may be a display panel using a liquid crystal layer as a display function layer or an organic electroluminescent (EL) panel using an organic light emitting layer as a display function layer, etc., but a display panel using a liquid crystal layer will be described below.

The display panel 11 includes a first substrate 111 (arrangement substrate), a second substrate 112 (counter-substrate) opposed to the first substrate 111, and a liquid crystal layer (not shown) formed between the first substrate 111 and the second substrate 112. A panel driver (liquid crystal driver) 113 which drives the display panel 11 is mounted on the first substrate 111, for example. The panel driver 113 can display an image in a display area DA (active area) of the display panel 11 by driving the display panel 11.

Further, the display panel 11 is integrally formed with a touch detection mechanism 12 which detects a change in capacitance, for example.

The touch detection mechanism 12 includes a plurality of touch detection electrodes Rx (first electrodes). The touch detection electrodes Rx are arranged in a location overlapping the display area DA of the display panel 11. The touch detection electrodes Rx are transparent electrodes, for example, and are formed of a transparent conductive material such as indium tin oxide (ITO). The touch detection electrodes Rx may be provided outside the display panel 11 or may be provided inside the display panel 11. The touch detection mechanism 12 is connected to a touch detection driver 121 via a flexible printed circuit board FPC2.

Although not shown in FIG. 1, in the display panel 11, the above-described common electrodes for image display are provided on the first substrate 111. In the present embodiment, the common electrodes are used as one of the pair of electrodes for touch detection, and are arranged in a location opposed to the touch detection electrodes Rx. The common electrodes are formed of a transparent conductive material such as indium tin oxide (ITO), for example.

The display device 10 according to the present embodiment can detect contact or proximity of an object (object to be detected) with the display area DA based on electrostatic capacitance (mutual electrostatic capacitance) between the touch detection electrodes Rx and the common electrodes. Although the display device 10 can detect contact or proximity of an object, the following description will be based on the assumption that the display device 10 simply detects contact of an object for the sake of convenience.

Further, a host device HOS is provided outside the display panel 11, for example, and the host device HOS is connected to the display panel 11 via a flexible printed circuit board FPC1 and the panel driver 113. Still further, the host device HOS is connected to the touch detection mechanism 12 via the flexible printed circuit board FPC2 and the touch detection driver 121.

The panel driver 113 and the touch detection driver 121 may also be formed as a single chip. If the touch detection driver 121 and the panel driver 113 are formed as a single chip, the chip may be arranged on the second substrate 112, the flexible printed circuit board FPC1 or the flexible printed circuit board FPC2. In this case, the flexible printed circuit board FPC1 or the flexible printed circuit board FPC2, etc., may be omitted.

A backlight unit 13 is arranged on the lower side of the first substrate 111 (that is, the back surface side of the display panel 11) as an illumination device which illuminates the display panel 11. A flexible printed circuit board FPC3 connects the backlight unit 13 and the host device HOS. Any one of various backlight units may be available as the backlight unit 13, and the light source may be a light source using a light-emitting diode (LED), a light source using a cold-cathode fluorescent lamp (CCFL), etc. Here, the backlight unit 13 arranged on the back surface side of the display panel 11 is used, but a front light arranged on the display surface side of the display panel 11 may be used. Further, an illumination device using LEDs or cold-cathode fluorescent lamps arranged on and beside a light guide may be used, or an illumination device using point light sources where light emitting elements are planarly arranged may be used. If the display device 10 is a reflective display device or the display panel 11 uses organic EL, the display device 10 may not include any illumination device.

Further, the display panel 11 of the present embodiment may be any one of a transmissive display panel, a reflective display panel and a transflective display panel. The display device 10 adopting the transmissive display panel 11 includes the backlight unit 13 on the back surface side of the first substrate 111 as described above, and has the transmissive display function of displaying an image by selectively transmitting light from the backlight unit 13. The display device 10 adopting the reflective display panel 11 includes a reflective layer which reflects light in a location closer to the back surface side of the display panel 11 than the liquid crystal layer. This display device 10 has the reflective display function of displaying an image by selectively reflecting light from the front surface side (display surface side) of the second substrate 112. Note that an auxiliary light source may be provided on the front surface side of the reflective display panel 11. Further, the reflective layer may be formed of a reflective material such as metal, and may be configured to form an electrode provided on the rear side on the display panel 11 in comparison with the liquid crystal layer. The display device 10 adopting the transflective display panel 11 has the transmissive display function and the reflective display function.

Figure 2:
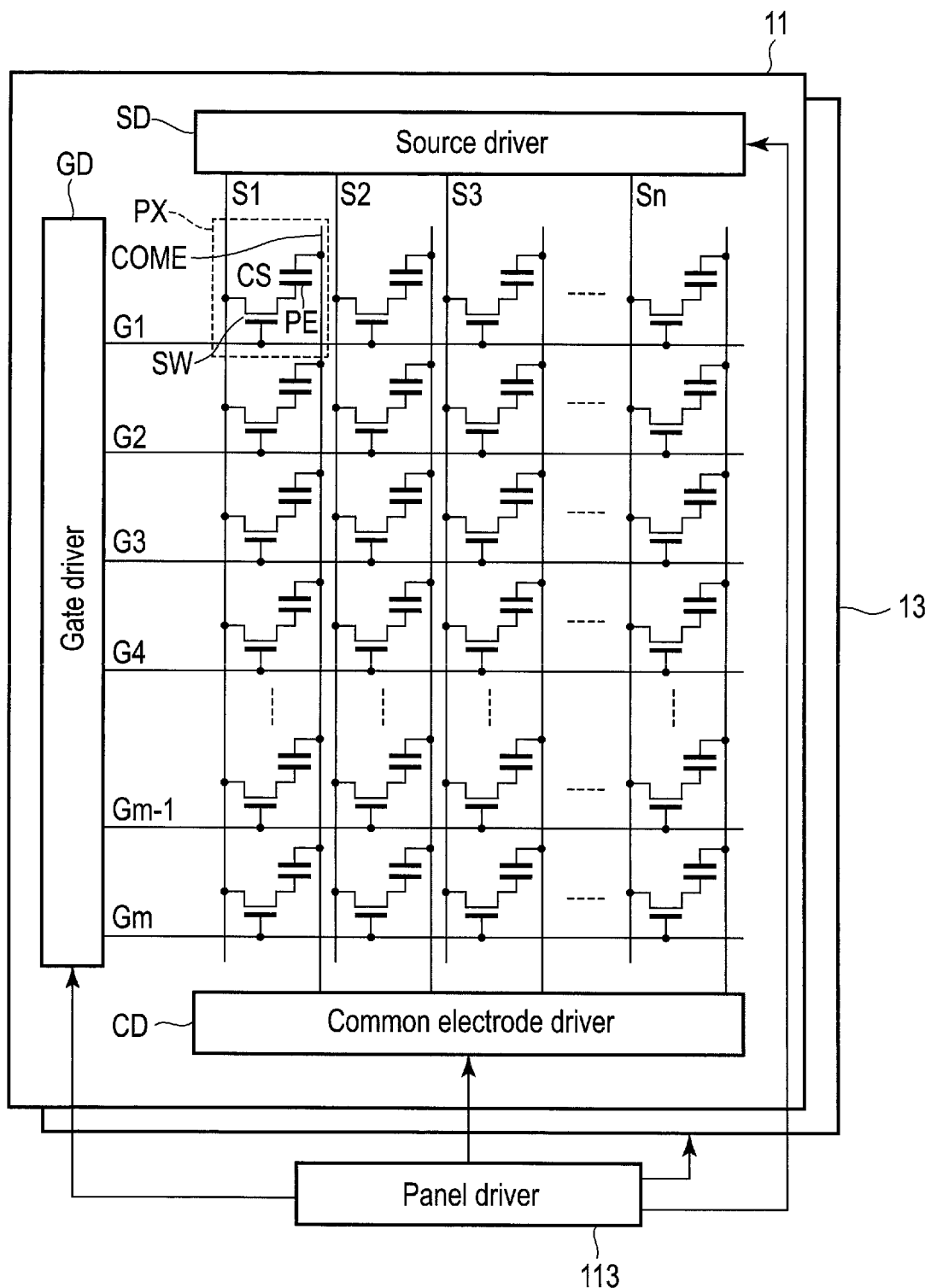
FIG. 2 is a diagram schematically showing the structure of a display panel.

FIG. 2 schematically shows the structure of the display panel 11 provided in the display device 10. As shown in FIG. 2, the display panel 11 includes a plurality of display pixels PX (display elements) arranged in a matrix. Further, the display panel 11 includes scanning lines G (G1, G2, . . . , Gm) extending along the rows of the display pixels PX and signal lines S (S1, S2, . . . , Sn) extending along the columns of the display pixels PX, and pixel switches SW provided in the vicinity of the intersections of the scanning lines G and the signal lines S.

The pixel switch SW includes a thin-film transistor (TFT). The gate electrode of the pixel switch SW is electrically connected to the corresponding scanning line G. The source electrode of the pixel switch SW is electrically connected to the corresponding signal line S. Further, the drain electrode of the pixel switch SW is electrically connected to a corresponding pixel electrode PE. Note that the source electrode of the pixel switch SW may be connected to the corresponding pixel electrode PE and the drain electrode of the pixel switch SW may be connected to the corresponding signal line S instead.

Further, the display panel 11 includes a gate driver GD and a source driver SD which drive the display pixels PX. The scanning lines G are electrically connected to output terminals of the gate driver GD. The signal lines S are electrically connected to output terminals of the source driver SD.

The gate driver GD sequentially applies an on-state voltage to the scanning lines G and supplies the on-state voltage to the gate electrodes of the pixel switches SW which are electrically connected to the selected scanning lines G. In the pixel switch SW in which the on-state voltage is supplied to the gate electrode, the source electrode and the drain electrode are electrically connected to each other.

The source driver SD supplies output signals corresponding to the signal lines S, respectively. The signal supplied to the signal line S is supplied to the corresponding pixel electrode PE via the pixel switch SW in which the source electrode and the drain electrode are electrically connected to each other.

Further, the display panel 11 includes a common electrode driver CD. The common electrode driver CD is a circuit which supplies a drive signal (which applies a drive voltage) to common electrodes COME. The pixel electrodes PE and the common electrodes COME are opposed to each other via an insulating film. The pixel electrodes PE, the common electrodes COME and the insulating film form storage capacitance CS. The common electrodes COME are arranged such that the extension direction of the common electrodes COME crosses the extension direction of the scanning lines G.

The gate driver GD, the source driver SD and the common electrode driver CD are arranged in an area (frame) around the display panel 11 and are controlled by the panel driver 113. Further, the panel driver 113 controls the operation of the backlight unit 13.

Although only one gate driver GD is shown in FIG. 2, the display panel 11 may include a plurality of gate drivers GD. If the display panel 11 includes two gate drivers GD, for example, one gate driver GD is connected to the scanning lines G1, G3, . . . , Gm−1 among the scanning lines G, and the other gate driver GD is connected to the scanning lines G2, G4, . . . , Gm among the scanning lines G. The two gate drivers GD face each other across the display pixels PX, for example.

FIG. 3 is an explanatory diagram showing the basic operation of the touch detection mechanism 12. Here, a touch detection operation (operation of detecting contact of an object) by a mutual capacitance detection method will be described.

In the touch detection mechanism 12 of the mutual capacitance detection method, the touch detection function is realized by the touch detection electrodes (detection elements) Rx formed in a stripe shape, for example, in an X direction (first direction) on the second substrate 112, and drive electrodes Tx formed in a stripe shape in a Y direction (second direction) on the first substrate 111. As shown in FIG. 3, the touch detection electrodes Rx and the drive electrodes Tx cross each other. The common electrodes COME for image display are used as the drive electrodes Tx.

Note that the touch detection electrodes Rx may be formed in a stripe shape in the Y direction and the drive electrodes Tx may be formed in a stripe shape in the X direction instead.

In this structure, the drive electrodes Tx are sequentially driven by a radio-frequency pulse drive signal (touch drive signal). In this case, for example, as compared to the output from the other touch detection electrodes Rx, a touch detection signal having a lower level is detected from the touch detection electrode Rx in proximity to an object such as a finger. This is because, in addition to first capacitance formed between the touch detection electrode Rx in proximity to the finger and the drive electrode Tx, second capacitance is formed between the touch detection electrode Rx and the finger. That is, the touch detection electrode Rx can output a touch detection signal based on a change in electrostatic capacitance according to a finger.

According to the touch detection mechanism 12, the coordinates of the location (contact location) of the finger can be determined from the drive timing of the drive electrode Tx and the position of the touch detection electrode Rx which outputs the low-level detection signal.

Figure 4:
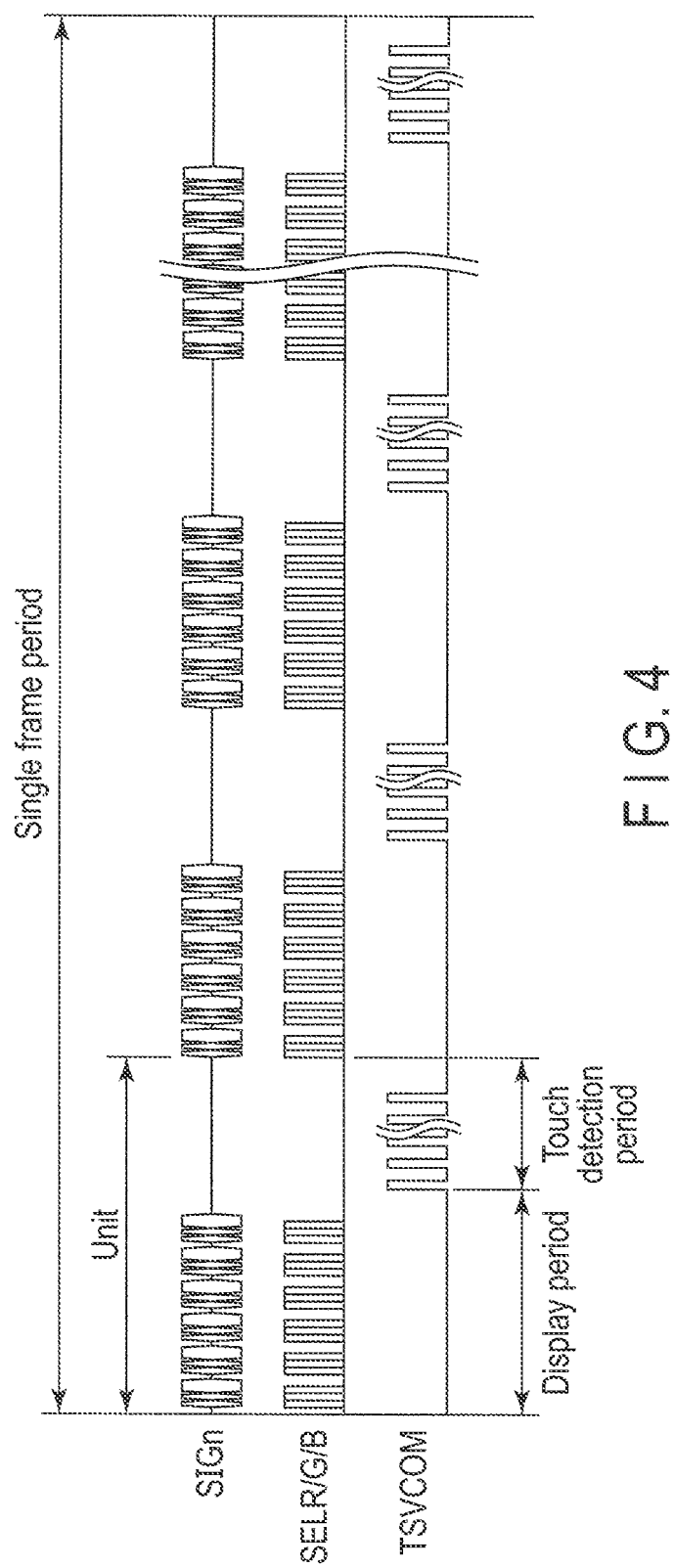
FIG. 4 is an explanatory diagram showing an example of the relationship between a display period and a touch detection period in the display device.

FIG. 4 shows an example of the relationship between a display period and a touch detection period in the display device 10.

In the present embodiment, the display period includes a period of executing a display operation of displaying an image in the display area DA in the display panel 11 (drive operation with respect to the display pixels PX by the gate driver GD and the source driver SD). On the other hand, the touch detection period includes a period of executing a touch detection operation of detecting contact of an object in the touch detection mechanism 12 (for example, an operation of detecting the touch detection signal by supplying a touch drive signal to the drive electrodes Tx).

Here, the stripe-shaped common electrodes COME are used as the drive electrodes Tx to which the touch drive signal is supplied in the touch detection period as described above. That is, the common electrodes COME for image display in the display area DA are also used as the drive electrodes Tx for touch detection, and therefore the display operation and the touch detection operation are executed in a time sharing manner in the present embodiment.

More specifically, as shown in FIG. 4, a period of displaying a single frame image by the above-described display operation (hereinafter referred to as a single frame period) is formed of a plurality of units. A single unit is split into the display period and the touch detection period. That is, during the period of a single unit, after an operation (display operation) of outputting a pixel signal (SIGn) per color according to a signal (SELR/G/B) which selects one of three colors R, G and B is executed with respect to a plurality of display lines (the display period), an operation of supplying a touch drive signal (drive pulse TSVCOM) to the common electrodes COME as the drive electrodes Tx is executed (the touch detection period). Since the single frame period is formed of a plurality of units as described above, the display period and the touch detection period are alternately repeated in the single frame period.

Figure 5:
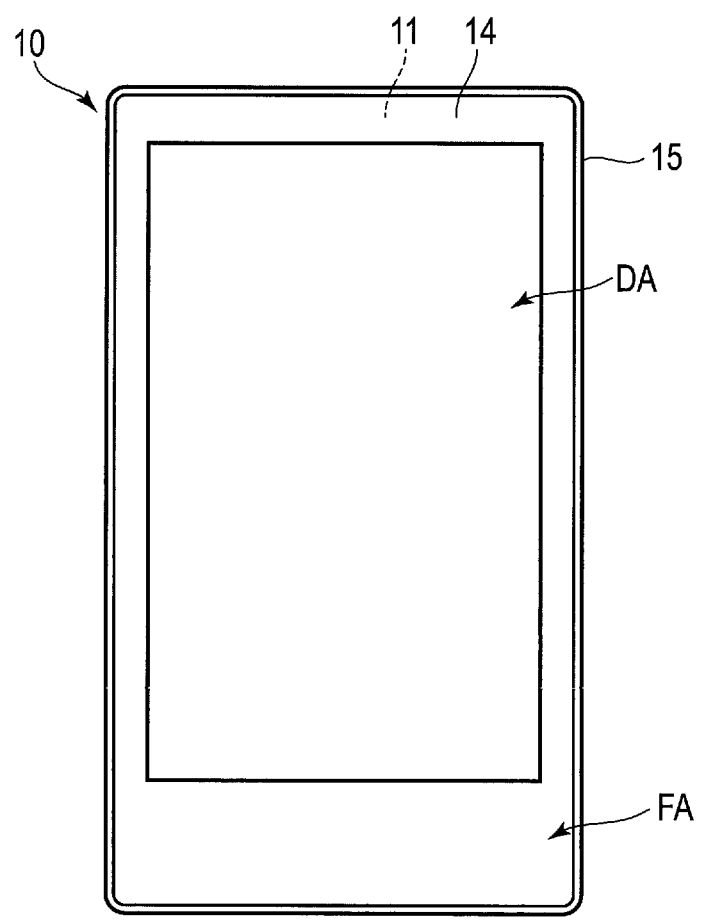
FIG. 5 is a diagram showing an example of the external appearance of the display device.

Here, the display device 10 according to the present embodiment can be realized as a smartphone (or a tablet computer) shown in FIG. 5, for example.

If the display device 10 is realized as a smartphone, etc., the display device 10 includes a cover base 14, a housing 15, etc., in addition to the display panel 11, the touch detection mechanism 12, the backlight unit 13, etc., shown in FIG. 1.

The cover base 14 covers the display area DA of the display panel 11 and a frame area FA (peripheral area) outside the display area DA. The cover base 14 is formed of transparent glass, for example, and has the function of protecting the display panel 11, etc. The cover base 14 may be formed of a transparent resin material instead.

Further, the housing 15 accommodates the display panel 11, the touch detection mechanism 12, the backlight unit 13, etc.

Meanwhile, in the display device 10 such as a smartphone, if the touch detection electrodes Rx and the drive electrodes Tx (common electrodes COME) are arranged in a location overlapping the display area DA, contact of an object cannot be detected in the frame area FA, for example.

On the other hand, if contact of an object can be detected also in the frame area FA, the user of the display device 10 can perform various operations also with respect to the frame area FA, and the convenience of the user improves.

Figure 6:
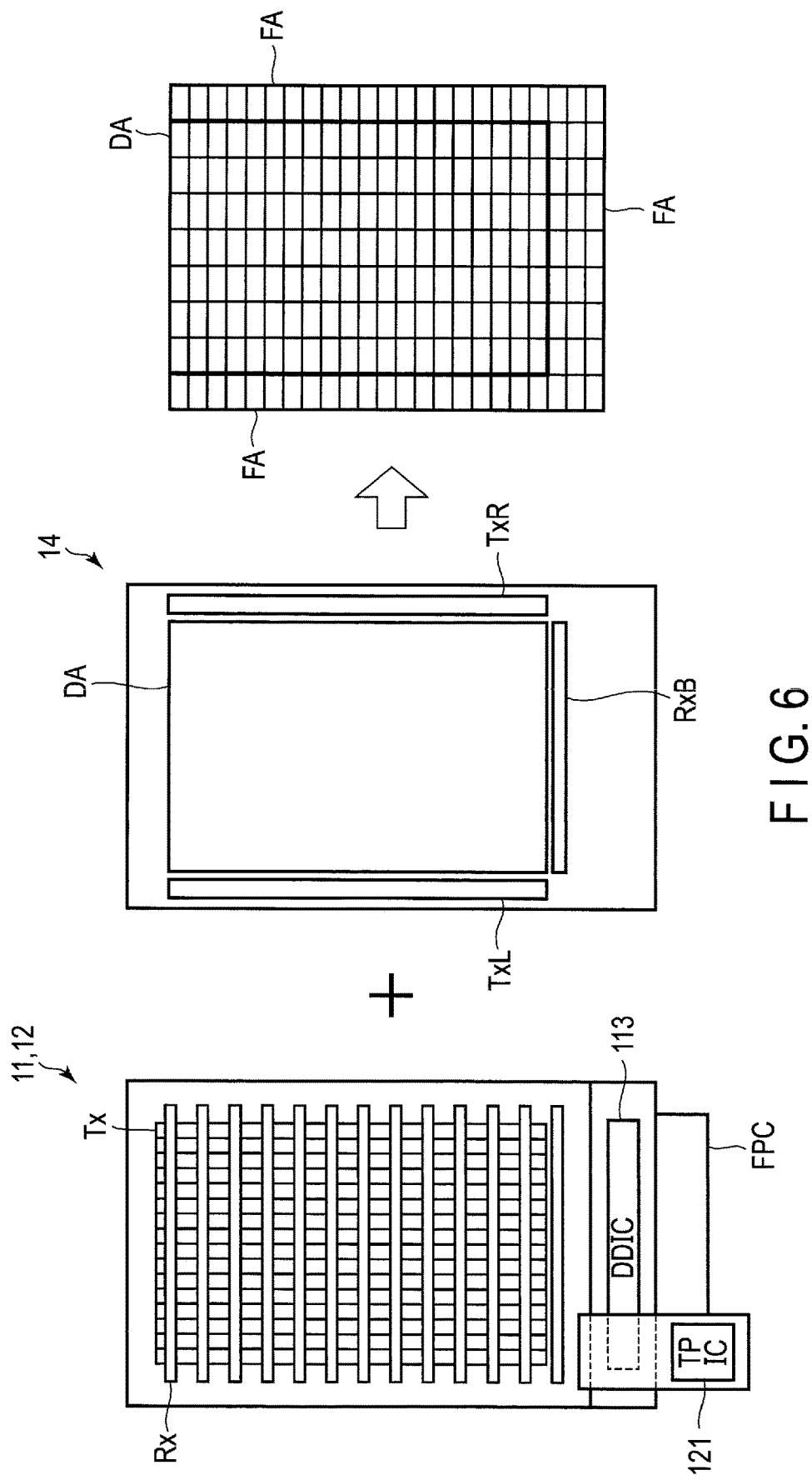
FIG. 6 is a diagram showing a comparative example of the present embodiment.

Therefore, to realize detection of contact of an object with respect to the frame area FA, as shown in FIG. 6, for example, a structure (hereinafter referred to as a comparative example of the present embodiment) further including drive electrodes TxL and TxR and a touch detection electrode RxB overlapping the frame area FA in the cover base 14, in addition to the drive electrodes Tx (common electrodes COME) and the touch detection electrodes Rx arranged in a location overlapping the display area DA, is assumed.

In this structure, contact of an object with respect to the frame area FA (here, an area corresponding to the drive electrodes TxL and TxR) can be detected by a change in capacitance between the drive electrodes TxL and TxR arranged in a location overlapping the frame area FA and the touch detection electrodes Rx arranged in a location overlapping the display area DA. Further, contact of an object with respect to the frame area FA (here, an area corresponding to the touch detection electrode RxB) can be detected by a change in capacitance between the touch detection electrode RxB arranged in a location overlapping the frame area FA and the drive electrodes Tx arranged in a location overlapping the display area DA.

That is, according to a comparative example of the present embodiment, not only contact of an object with respect to the display area DA but also contact of an object with respect to the frame area FA corresponding to a location in which cover base 14 side electrodes (that is, the drive electrodes TxL and TxR and the touch detection electrode RxB) are arranged can be detected.

Here, to execute a touch detection operation using the drive electrodes TxL and TxR and the touch detection electrode RxB (hereinafter referred to as electrodes for the frame area FA), the electrodes for the frame area FA and the touch detection driver 121 need to be connected to each other.

However, the electrodes for the frame area FA are arranged in the cover base 14 in the comparative example of the present embodiment. In this case, to connect the electrodes for the frame area FA to the touch detection driver 121, it is necessary to separately provide a flexible printed circuit board for connecting the flexible printed circuit board FPC2 which is connected to the cover base 14 and the second substrate 112.

In this structure, expenses are incurred by providing the flexible printed circuit board, and structural limitations are also imposed by providing the flexible printed circuit board. Further, expenses are also incurred by arranging the electrodes for the frame area FA in the cover base 14.

Still further, if the electrodes for the frame area FA are arranged in the cover base 14 as in the comparative example of the present embodiment, due to damage (breakage) in the cover base 14, contact of an object with respect to the frame area FA cannot be detected in some cases.

Still further, the touch detection electrode RxB is arranged on the lower side of the display area DA in FIG. 6, but in light of an improvement of the convenience of the user, a touch detection electrode (hereinafter referred to as a touch detection electrode RxU) should preferably arranged also on the upper side of the display area DA, for example. In this case, contact of an object can be detected also in the frame area FA on the upper side of the display area DA, and the versatility of use of the display device 10 can be increased, accordingly.

However, it is necessary to form a wire from the touch detection electrode RxU arranged the upper side of the display area DA to the touch detection driver 121 (that is, the lower side of the display area DA) in a structure in which the electrodes for the frame area FA are arranged in the cover base 14 as in the comparative example of the present embodiment. Therefore, it is difficult that the touch detection electrode RxU is arranged in the cover base 14.

Consequently, the present embodiment adopts a structure in which the electrodes for the frame area FA, i.e., the drive electrodes TxL and TxR are arranged in the first substrate 111 and the touch detection electrodes RxB and RxU are arranged in the second substrate 112.

Figure 7:
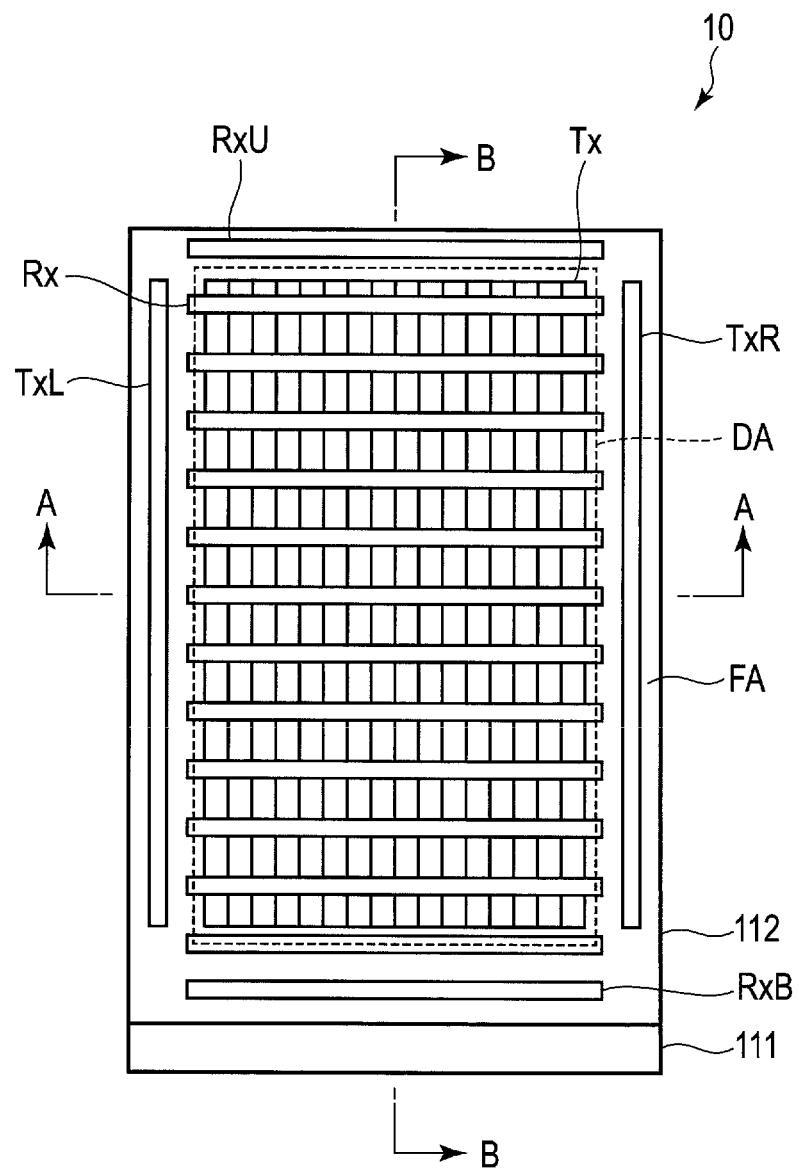
FIG. 7 is an explanatory diagram showing an example of the positional relationship of electrodes for a frame area.

The positional relationship between the drive electrodes Tx, the touch detection electrodes Rx, and the electrodes for the frame area FA (the drive electrodes TxL and TxR and the touch detection electrodes RxB and RxU) in the display device 10 according to the present embodiment will be described hereinafter with reference to FIG. 7. FIG. 7 is a plan view schematically showing the display device 10.

As shown in FIG. 7, the first substrate 111 and the second substrate 112 overlap each other in planar view in the display device 10. Further, the drive electrodes Tx provided on the first substrate 111 and the touch detection electrodes Rx provided on the second substrate 112 are arranged in a location overlapping the display area DA of the display panel 11. The display area DA has the shape of a rectangle having long sides and short sides, for example.

The drive electrodes Tx extend in a direction (second direction) along the long sides (second sides) of the display area DA and are arranged in a direction (first direction) along the short sides (first sides adjacent to the second sides) of the display area DA, in a location (range) overlapping the display area DA.

The touch detection electrodes Rx extend in a direction along the short sides of the display area DA and are arranged in a direction along the long sides of the display area DA in a location (range) overlapping the display area DA.

Further, the frame area FA is provided outside (around) the display area DA as described above. In the present embodiment, the frame area FA corresponds to an area located on the inner side from the periphery (of the housing 15) of the display device 10 and an area located on the outer side from the display area DA in planar view. Note that the periphery of the frame area FA has a substantially rectangular shape, for example.

As shown in FIG. 7, the drive electrodes TxL and TxR are arranged in (a location overlapping) the frame area FA. The drive electrode TxL extends in a direction along the long sides of the display area DA, and is arranged between the left long side of the display area DA and the left long side of the periphery of the display panel 11 (first substrate 111). The drive electrode TxR extends in a direction along the long sides of the display area DA, and is arranged between the right long side of the display area DA and the right long side of the periphery of the display panel 11 (first substrate 111).

That is, as shown in FIG. 7, the drive electrodes TxL and TxR face each other across the display area DA in a location overlapping the frame area FA of the first substrate 111. Note that the drive electrodes TxL and TxR are parallel to the drive electrodes Tx (common electrodes COME), for example. Further, the gap between the drive electrode TxL and the leftmost drive electrode Tx in the arrangement of the drive electrodes Tx is wider than the gap between the drive electrodes Tx. Similarly, the gap between the drive electrode TxR and the rightmost drive electrode Tx in the arrangement of the drive electrodes Tx is wider than the gap between the drive electrodes Tx. This is because the drive electrodes TxL and TxR are arranged in such locations in which the drive electrodes TxL and TxR do not overlap wires which connect the touch detection electrodes Rx on the second substrate 112 and the touch detection driver 121.

Further, the touch detection electrodes RxB and RxU are arranged in the frame area FA. The touch detection electrode RxB extends in a direction along the short sides of the display area DA, and is arranged between the lower short side of the display area DA and the lower short side of the periphery of the display panel 11 (second substrate 112). The touch detection electrode RxU extends in a direction along the short sides of the display area DA, and is arranged between the upper short side of the display area DA and the upper short side of the periphery of the display panel 11 (second substrate 112).

That is, as shown in FIG. 7, the drive electrodes RxB and RxU face each other across the display area DA (touch detection electrodes Rx) in a location overlapping the frame area FA of the first substrate 112. Note that the touch detection electrodes RxB and RxU are parallel to the touch detection electrodes Rx, for example.

The display device 10 according to the present embodiment can detect contact of an object with the frame area FA by using capacitance (change) between the electrodes for the frame area FA arranged in the location overlapping the frame area FA and the electrodes arranged in the location overlapping the display area DA.

Further, although omitted in FIG. 7, etc., the drive electrodes Tx (common electrodes COME) are arranged such that the extension direction of the drive electrodes Tx (common electrodes COME) crosses the extension direction of the scanning lines G as shown in FIG. 2. Therefore, wires from the drive electrodes Tx, TxL and TxR can be drawn toward the short sides of the frame area FA (the flexible printed circuit board FPC1 side). Accordingly, in contrast to a case where the common electrodes COME are arranged orthogonally to the signal lines S, the common electrode driver CD does not need to be provided beside the long sides of the frame area FA. Therefore, the gap between the long sides of the display area DA and the long sides of the frame area FA (the gap along the long sides of the frame area FA) can be reduced.

Next, the touch detection operation using the electrodes for the frame area FA in the present embodiment will be described with reference to FIGS. 8 and 9.

Figure 8:
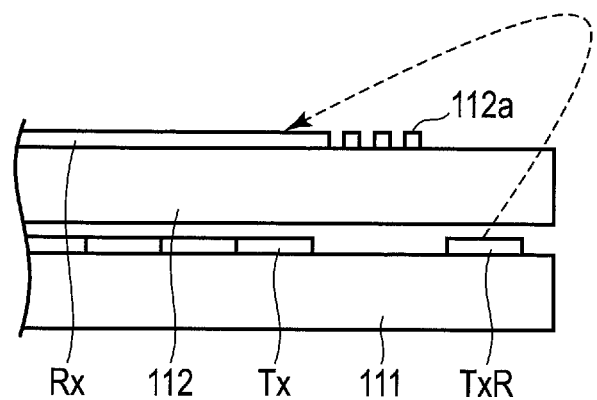
FIG. 8 is a sectional view of the display device taken along line A-A shown in FIG. 7.

FIG. 8 is a sectional view of the display device 10 taken along line A-A shown in FIG. 7. The left part of the display device 10 shown in FIG. 7 is omitted in FIG. 8. Here, the drive electrodes Tx and TxR and the touch detection electrodes Rx are mainly illustrated, and the other structure is omitted.

The first substrate 111 and the second substrate 112 are opposed to each other in the display device 10.

The drive electrodes Tx are arranged on the first substrate 111, and the touch detection electrodes Rx are arranged on the second substrate 112. Further, wires 112a which connect the touch detection electrodes Rx and the touch detection driver 121 are formed on the second substrate 112 on the outer side from ends of the touch detection electrodes Rx (the right side in FIG. 7). In FIG. 8, only three wires are illustrated for the sake of convenience.

Here, the drive electrode TxR is arranged on the first substrate 111. The drive electrode TxR is arranged at a predetermined distance from the drive electrode Tx arranged at the end on the drive electrode TxR side such that the drive electrode TxR does not overlap the wires 112a formed on the substrate 112.

In this case, if a touch drive signal is supplied to the drive electrode TxR, for example, electric lines of force are formed from the drive electrode TxR to the touch detection electrodes Rx (electrostatic capacitance is formed between the drive electrode TxR and the touch detection electrodes Rx).

Here, it is assumed that a finger (conductor) contacts the vicinity of the drive electrode TxR (either the vicinity of the boundary between the display area DA and the frame area FA or the frame area FA). In this case, the above-described electric line of force is cut off, the capacitance between the drive electrode TxR and the touch detection electrode Rx is changed, and consequently the potential of the output of the touch detection electrode Rx (the level of a touch detection signal) is reduced.

Therefore, in the case of using the drive electrode TxR also, contact of a finger with the frame area FA can be detected similarly to the touch detection operation by the mutual capacitance detection method.

If the drive electrode TxR is arranged in a location overlapping the wires 112a, for example, the electric lines of force from the drive electrode TxR to the touch detection electrodes Rx are less likely to be formed. Therefore, degradation of touch detection accuracy can be prevented by arranging the drive electrode TxR in a location which does not overlap the wires 112a.

Although the description here focuses on the touch detection operation using the drive electrode TxR, contact of an object can be detected also in the touch detection operation using the drive electrode TxL.

In the present embodiment, contact of a finger, etc., with the frame area FA is detected by a change in capacitance between the drive electrodes TxL and TxR arranged in (a location overlapping) the frame area FA and the touch detection electrodes Rx arranged in (a location overlapping) the display area DA. Further, contact of a finger, etc., with the display area DA is detected by a change in capacitance between the drive electrodes Tx and the touch detection electrodes Rx arranged in the display area DA. Therefore, if the drive electrodes TxL and TxR and the drive electrodes Tx are sequentially driven, degradation of the touch detection sensitivity near the periphery of the display area DA can be prevented.

Figure 9:
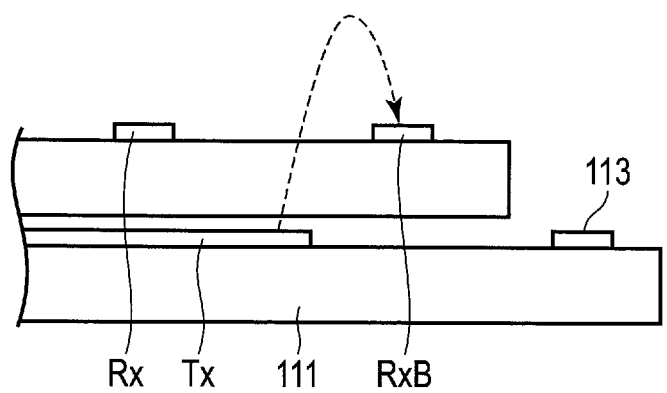
FIG. 9 is a sectional view of the display device taken along line B-B shown in FIG. 7.

FIG. 9 is a sectional view of the display device 10 taken along line B-B shown in FIG. 7. The upper part of the display device 10 shown in FIG. 7 is omitted in FIG. 9. Here, the drive electrode Tx, and the touch detection electrodes Rx and RxB are mainly illustrated, and the other structure is omitted.

The touch detection electrode RxB is arranged on the second substrate 112 as described above, but more specifically, the touch detection electrode RxB is arranged in a location overlapping the frame area FA on the outer side from the ends of the drive electrodes Tx (the lower side in FIG. 7) as shown in FIG. 9.

In this case, if a touch drive signal is supplied to the drive electrodes Tx, electric lines of force are formed from the drive electrodes Tx to the touch detection electrode RxB (electrostatic capacitance is formed between the drive electrodes Tx and the touch detection electrode RxB).

Here, it is assumed that a finger (conductor) contacts the vicinity of the touch detection electrode RxB (either the vicinity of the boundary between the display area DA and the frame area FA or the frame area FA). In this case, the above-described electric line of force is cut off, the capacitance between the drive electrode Tx and the touch detection electrode RxB is changed, and consequently the potential of the output of the touch detection electrode RxB (the level of a touch detection signal) is reduced.

Therefore, in the case of using the drive electrode RxB also, contact of a finger with the frame area FA can be detected similarly to the touch detection operation by the mutual capacitance detection method.

Although the description here focuses on the touch detection operation using the drive electrode RxB, contact of an object can be detected also in the touch detection operation using the drive electrode RxU.

According to the display device 10 of the present embodiment, not only the display area DA but also the frame area FA can function as a touch detection area (area which can detect contact of an object) as described above.

Figure 10:
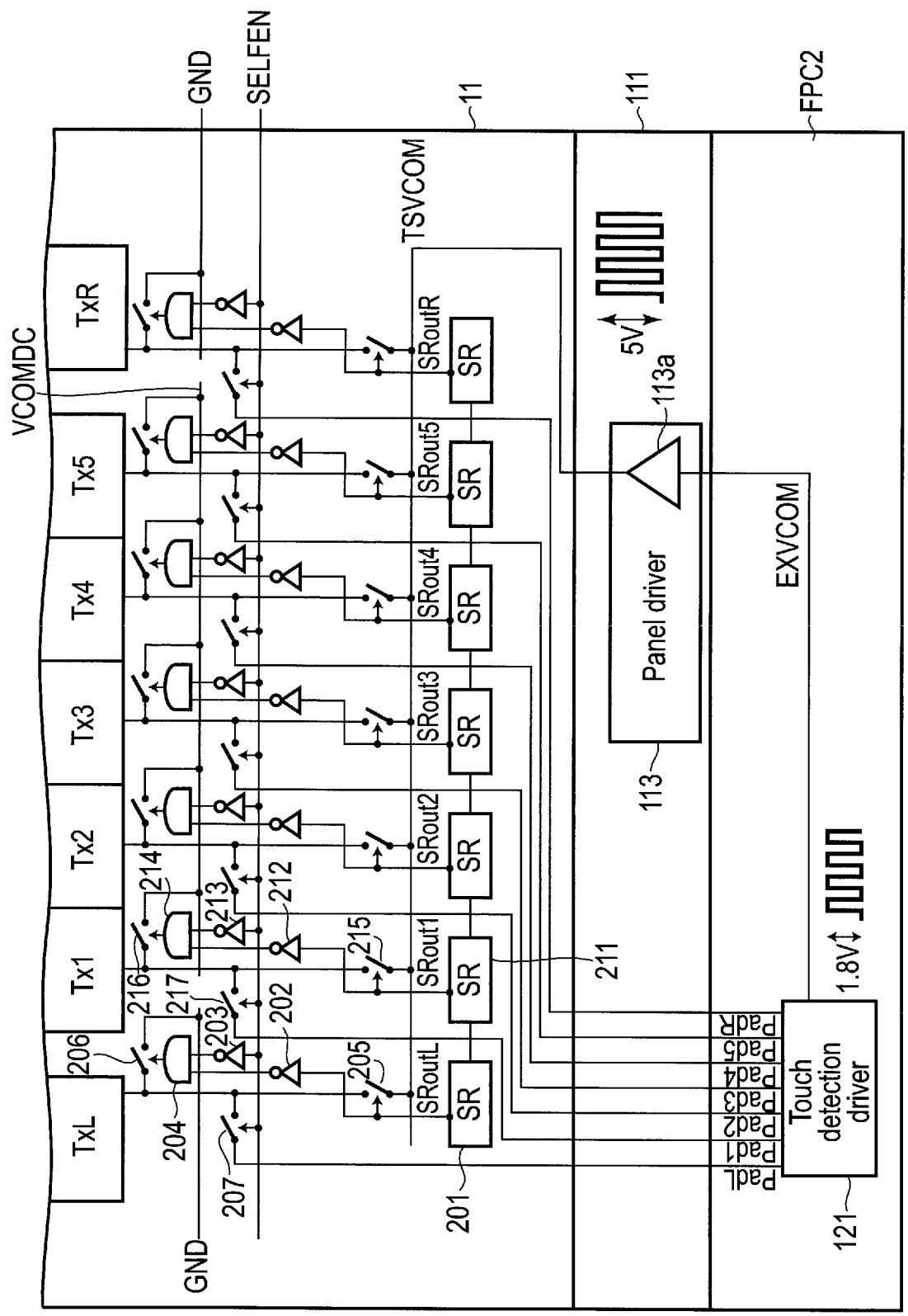
FIG. 10 is an explanatory diagram showing an example of the circuit structure of the display panel.

An example of the circuit structure (panel circuit) of the display panel 11 will be described hereinafter with reference to FIG. 10. In FIG. 10, a structure for supplying a touch detection signal to each drive electrode in the execution of a touch detection operation (that is, during a touch detection period) will be mainly described. That is, the gate driver GD, the source driver SD, etc., which execute a drive operation of the display pixels PX (that is, a display operation) are omitted in FIG. 10.

Here, drive electrodes Tx1 to Tx5 are provided as the drive electrodes Tx in the display panel 11 show in FIG. 10. The drive electrodes Tx1 to Tx5 are arranged in a location overlapping the display area DA on the first substrate 111. On the other hand, the drive electrodes TxL and TxR are arranged in a location overlapping the frame region FA on the first substrate 111. In the execution of a touch detection operation, a touch drive signal is supplied to these drive electrodes.

The panel driver 133 is provided on the first substrate 111 and includes a level shifter 113a.

The display panel 11 includes a shift register circuit, an inverter (NOT gate), an AND circuit, a level shifter, etc. The shift register circuit, the inverter and the AND circuit are provided for each of the drive electrodes TxL, Tx1 to Tx5, and TxR.

Firstly, a shift register circuit 201, an inverter 202, an inverter 203 and an AND circuit 204 provided for the drive electrode TxL will be described.

As control signals related to the touch detection operation, for example, a touch detection start pulse and a touch detection clock are input to the shift register circuit 201. According to the touch detection start pulse and the touch detection clock, the shift registers provided respectively for the drive electrodes TxL, Tx1 to Tx5, and TxR are sequentially selected in the execution of the touch detection operation by the mutual capacitance detection method. If the shift register circuit 201 is selected, the shift register circuit 201 outputs "1".

The inverter 202 is connected to the shift register circuit 201. The inverter 202 outputs "0" if the output from the shift register circuit 201 is "1", and the inverter 202 outputs "1" if the output from the shift register circuit 201 is "0".

Here, the touch detection operation may be executed by a detection method other than the mutual capacitance detection method such as a self capacitance detection method in the touch detection mechanism 12. Note that the mutual capacitance detection method is a method of detecting contact of an object based on electrostatic capacitance (mutual electromagnetic capacitance) between the drive electrode and the touch detection electrode as described above. On the other hand, the self capacitance detection method is a method of detecting contact of an object based on a change in electrostatic capacitance (self electromagnetic capacitance) of a single electrode (for example, a drive electrode) in accordance with proximity or non-proximity of an object with respect to the electrode.

A detection method designation signal SELFEN is input to the inverter 203. The detection method designation signal SELFEN is "1 (High)" if the touch detection operation by the self capacitance detection method is executed, and the detection method designation signal SELFEN is "0 (Low)" if the touch detection operation by the mutual capacitance detection method is executed. If the detection method designation signal SELFEN is "1" (that is, the touch detection operation by the self capacitance detection method is executed), the inverter 203 outputs "0". Further, if the detection method designation signal SELFEN is "0" (that is, the touch detection operation by the mutual capacitance detection method is executed), the inverter 203 outputs "1".

One input terminal of the AND circuit 204 is connected to the output terminal of the inverter 202. The other input terminal of the AND circuit 204 is connected to the output terminal of the inverter 203. The AND circuit 204 outputs "1" if "1" is input to both of the input terminals, and the AND circuit 204 outputs "0" if "0" is input to at least one of the input terminals.

Here, the touch detection driver 121 is arranged on the flexible printed circuit board FPC2 and outputs a pulse signal in which a voltage periodically changes in the touch detection period, namely, a drive signal EXVCOM as the touch detection signal. The panel driver 113 supplies a drive pulse TSVCOM, which is obtained through level shifting and impedance conversion of the drive signal EXVCOM, to the drive electrodes (drive electrodes TxL, TxR and Tx1 to Tx5). If the drive signal EXVCOM has a signal level of about 1.8 V, for example, the level shifter 113a of the panel driver 113 outputs the drive pulse TSVCOM having an increased signal level of about 5 V, for example.

As shown in FIG. 10, a switch 205 is provided between the drive electrode TxL and the touch detection driver 121 (panel driver 113). The switch 205 is in a connected state (on state) if the output of the shift register circuit 201 is "1", and the switch 205 is in a disconnected state (off state) if the output of the shift register circuit 201 is "0".

According to the switch 205, if the shift register circuit 201 is selected, the drive pulse TSVCOM is supplied to the drive electrode TxL.

Further, a ground voltage (GND) is supplied to the drive electrode TxL via a switch 206. The switch 206 is in the connected state if the output of the AND circuit 204 is "1", and the switch 206 is in the disconnected state if the output of the AND circuit 204 is "0". According to the switch 206, if the touch detection operation by the mutual capacitance detection method is executed (that is, the detection method designation signal SELFEN is "0") and the shift register circuit 201 is not selected (that is, the output of the shift register circuit 201 is "0"), the ground voltage is supplied to the drive electrode TxL.

Further, (a plurality of switches including) a switch 207 is provided as a switch which switches between the mutual capacitance detection method and the self capacitance detection method in the present embodiment. The switch 207 is in the connected state if the detection method designation signal SELFEN is "1", and the switch 207 is in the disconnected state if the detection method designation signal SELFEN is "0". Accordingly, if the switch 207 is in the connected state (that is, the detection method designation signal SELFEN is "1"), a touch drive signal (drive pulse) for the self capacitance detection method output from the touch detection driver 121 is supplied to the drive electrode TxL. If the switch 207 is in the disconnected state (that is, the detection method designation signal SELFEN is "0"), the drive pulse TSCVOM (that is, a touch drive signal for the mutual capacitance detection method) or the ground voltage is supplied to the drive electrode TxL.

In FIG. 10, the touch drive signal for the self capacitance detection method supplied to the drive electrodes TxL, Tx1 to Tx5, and TxR is represented as PadL, Pad1 to Pad5, and PadR respectively.

Although the description here focuses on the drive electrode TxL, the same also applies to the drive electrode TxR, and therefore detailed description thereof is omitted.

Further, a shift register 211, an inverter 212, an inverter 213 and an AND circuit 214 similar to the shift register circuit 201, the inverter 202, the inverter 203 and the AND circuit 204 are provided for the drive electrode Tx1.

Here, the ground voltage is supplied to the drive electrode TxL via the switch 206, but a direct-current voltage VCOMDC is supplied to the drive electrode Tx1 via a switch 216 which is switched between the connected state and the disconnected state according to the output of the AND circuit 214. The direct-current voltage (signal) VCOMDC corresponds to the drive signal for the display operation.

According to the switch 216, if the touch detection operation by the mutual capacitance detection method is executed (that is, the detection method designation signal SELFEN is "0") and the shift register circuit 211 is not selected (that is, the output of the shift register circuit 211 is "0"), the direct-current voltage VCOMDC is supplied to the drive electrode Tx1.

Switches 215 and 217 provided for the drive electrode Tx1 are the same as the switches 205 and 207, and therefore detailed description thereof is omitted. That is, the switch 217 provided for the drive electrode Tx1 functions as a switch which switches between the mutual capacitance detection method and the self capacitance detection method, similarly to the switch 207 provided for the drive electrode TxL.

Although the description here focuses on the drive electrode Tx1, the same also applies to the other drive electrodes Tx2 to Tx5. The shift register circuits, the inverters and the AND circuits provided for the drive electrodes Tx1 to Tx5 constitute the common electrode driver CD provided in the display panel 11.

Next, the touch detection operation in the display device 10 of the present embodiment will be described with reference to the timing chart shown in FIG. 11.

Here, after the touch detection operation by the mutual capacitance detection method is executed, the touch detection operation by the self capacitance detection method is executed (that is, the mutual capacitance detection method is switched to the self capacitance detection method). In FIG. 11, touch detection periods T1 to T7 correspond to a period of executing a touch detection operation by the mutual capacitance detection method, and touch detection periods T8 and T9 correspond to a period of executing a touch detection operation by the self capacitance detection method.

In the execution of the touch detection operation by the mutual capacitance detection method, the touch drive signal for the mutual capacitance detection method is sequentially supplied to the drive electrodes TxL, Tx1 to Tx5, and TxR.

Firstly, the touch detection period T1 in which the touch drive signal is supplied to the drive electrode TxL will be described.

The shift register circuit 201 provided for the drive electrode TxL is selected in the touch detection period T1. In this case, the shift register circuit 201 outputs "1".

Here, the touch detection driver 121 outputs the drive signal EXVCOM having a signal level of 1.8 V, for example, as the touch drive signal as described above. The drive signal EXVCOM is subjected to level shifting and impedance conversion by the panel driver 113 (level shifter 113a). Accordingly, the panel driver 113 outputs the drive pulse TSVCOM having a signal level of 5 V.

If the output (SRoutL) of the shift register circuit 201 is "1", the switch 205 is in the connected state as described above. In this way, the drive pulse TSVCOM having a signal level of 5 V is supplied to the drive electrode TxL.

Accordingly, the touch detection driver 121 can detect contact of an object with the frame area FA in which the drive electrode TxL is arranged, based on mutual electrostatic capacitance between the drive electrode TxL and the touch detection electrodes Rx.

If the shift register circuit 201 is selected, the output of the other shift register circuits (the shift register circuits provided for the drive electrodes Tx1 to Tx5 and TxR) is "0". In this case, the switches (such as the switch 215, etc.) provided between the touch detection driver 121 (panel driver 133) and the drive electrodes Tx1 to Tx5 and TxR are in the disconnected state, and therefore the drive pulse TSVCOM is not supplied to the drive electrodes Tx1 to Tx5 and TxR.

Figure 11:
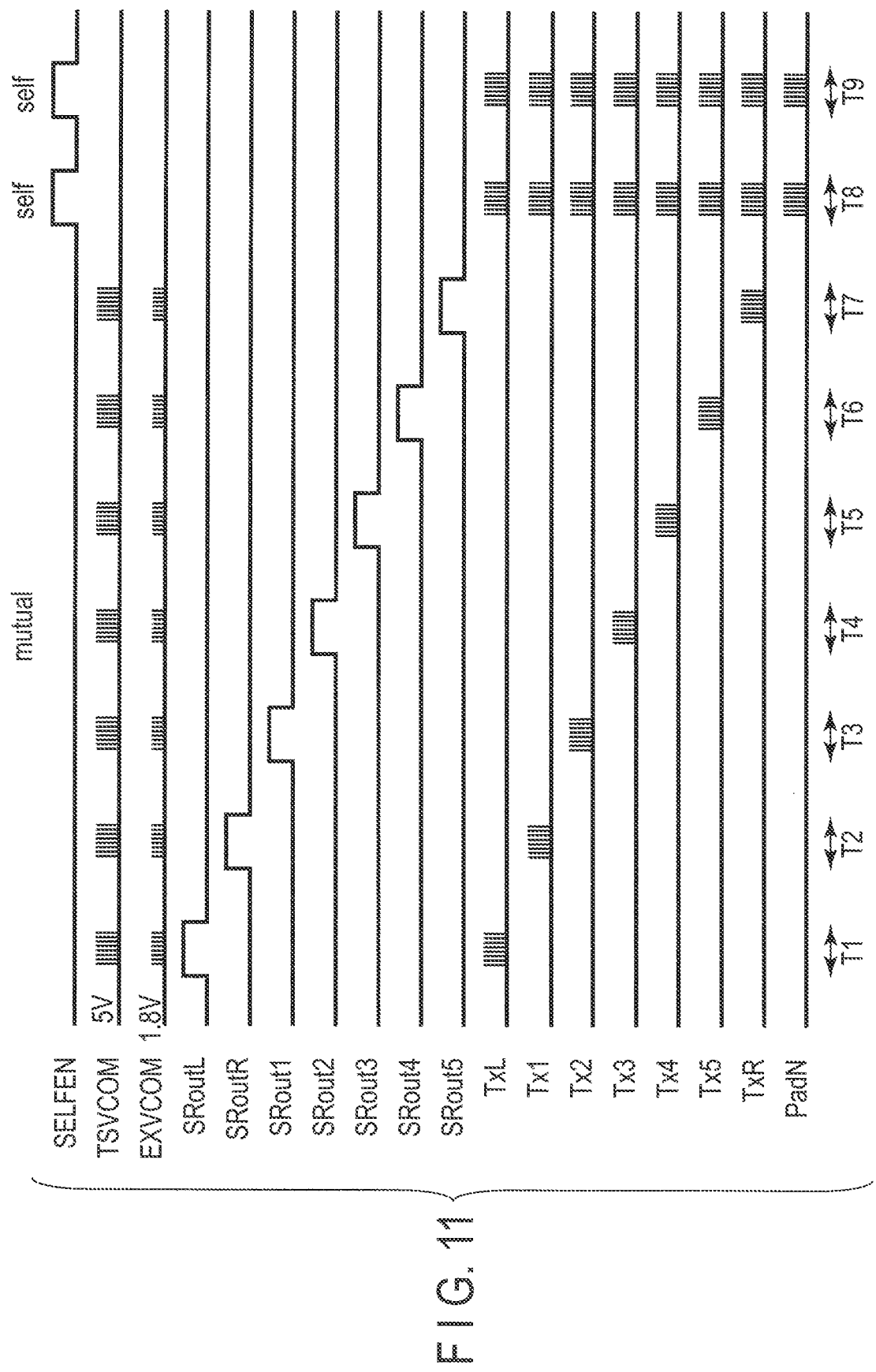
FIG. 11 is a timing chart showing a touch detection operation.

Further, as shown in FIG. 11, if the touch detection operation by the mutual capacitance detection method is executed (that is, the detection method designation signal SELFEN is "0"), a touch drive signal PadN for the self capacitance detection method is not output from the touch detection driver 121. The touch drive signal PadN shown in FIG. 11 represents the touch drive signals PadL, Pad1 to Pad5, and PadR for the self capacitance detection method which are supplied to the drive electrodes TxL, Tx1 to Tx5 and TxR.

In the touch detection period T1, since the output of the shift register circuit 201 is "1", the output of the inverter 202 is "0". Further, since the detection method designation signal SELFEN is "0", the output of the inverter 203 is "1". In this case, "0" is input to one input terminal of the AND circuit 204 and "1" is input to the other input terminal of the AND circuit 204, and thus the output of the AND circuit 204 is "0". Accordingly, the switch 206 is set to the disconnected state.

On the other hand, since the output of the shift register circuit 211 provided for the drive electrode Tx1 is "0", the output of the inverter 212 is "1". Further, since the detection method designation signal SELFEN is "0", the output of the inverter 213 to which the detection method designation signal SELFEN is input is "1". In this case, "1" is input to both terminals of the AND circuit 214 provided for the drive electrode Tx1, and thus the output of the AND circuit 214 is "1". Accordingly, the switch 216 is set to the connected state in accordance with the output of the AND circuit 214, and the direct-current voltage VCOMDC is supplied to the drive electrode Tx1 via the switch 216. Although the description here focuses on the drive electrode Tx1, the direct-current voltage VCOMDC is also supplied to the other drive electrodes Tx2 to Tx5.

Further, since the output of the shift register circuit provided for the drive electrode TxR is "0", the output of the inverter is "1". Still further, since the detection method designation signal SELFEN is "0", the output of the inverter to which the detection method designation signal is input is "1". In this case, "1" is input to both terminals of the AND circuit provided for the drive electrode TxR, and thus the output of the AND circuit is "1". Accordingly, the switch is set to the connected state in accordance with the output of the AND circuit, and the ground voltage is supplied to the drive electrode TxR via the switch.

That is, the drive pulse TSVCOM is supplied only to the drive electrode TxL in the touch detection period T1 shown in FIG. 11. Further, although not shown in FIG. 11, the direct-current voltage VCOMDC is supplied to the drive electrodes Tx1 to Tx5, and the ground voltage is supplied to the drive electrode TxR.

Next, the touch detection period T2 in which the touch drive signal is supplied to the drive electrode Tx1 will be described. The shift register circuit 211 provided for the drive electrode Tx1 is selected in the touch detection period T2. In this case, the shift register circuit 211 outputs "1".

If the output (SRoutL) of the shift register circuit 211 is "1", the switch 215 is in the connected state as described above. Accordingly, the drive pulse TSVCOM is supplied to the drive electrode Tx1. Note that the signal level of the drive pulse TSVCOM supplied to the drive electrode Tx2 is 5 V, for example.

Accordingly, the touch detection driver 121 can detect contact of an object with the display area DA in which the drive electrode Tx1 is arranged, based on mutual electrostatic capacitance between the drive electrode Tx1 and the touch detection electrodes Rx.

If the shift register circuit 211 is selected, the output of the other shift register circuits is "0", and thus the drive pulse TSVCOM is not supplied to the shift register circuits provided for the drive electrodes TxL, Tx2 to Tx5, and TxR. In this case, although detailed description is omitted, the ground voltage is supplied to the drive electrodes TxL and TxR, and the direct-current voltage VCOMDC is supplied to the drive electrodes Tx2 to Tx5.

Similarly, the drive pulse TSVCOM is supplied to the drive electrode Tx2 in the touch detection period T3, and the drive pulse TSVCOM is supplied to the drive electrode Tx3 in the touch detection period T4. Further, the drive pulse TSVCOM is supplied to the drive electrode Tx4 in the touch detection period T5. Still further, the drive pulse TSVCOM is supplied to the drive electrode Tx5 in the touch detection period T6. Still further, the drive pulse TSVCOM is supplied to the drive electrode TxR in the touch detection period T7, similarly to the drive electrode TxL in the touch detection period T1.

In the execution of the touch detection operation by the mutual capacitance detection method, the drive pulse TSVCOM is sequentially supplied to the drive electrodes TxL, Tx1 to Tx5, and TxR as described above.

Here, the description has been based on the assumption that the drive pulse TSVCOM is supplied in the order of the drive electrodes TxL, Tx1, Tx2, Tx3, Tx4, Tx5 and TxR but the order of drive electrodes to which the drive pulse TSVCOM is supplied can be appropriately changed.

Here, it is assumed that the mutual capacitance detection method is switched to the self capacitance detection method. In the execution of the touch detection operation by the self capacitance detection method, the touch drive signal PadN for the self capacitance detection method is supplied to the drive electrodes TxL, Tx1 to Tx5, and TxR, respectively.

The touch detection driver 121 outputs (supplies) the touch drive signal PadN (PadL, Rad1 to Pad5, and PadR) for the self capacitance detection method in the touch detection period T8 in which the touch detection operation by the self capacitance detection method is executed.

In the execution of the touch detection operation by the self capacitance detection method, the detection method designation signal SELFEN is "1". In this case, for example, since the switch 207 provided for the drive electrode TxL is in the connected state, the touch drive signal PadL output from the touch detection driver 121 is supplied to the drive electrode TxL. Since the same switches provided for the drive electrodes Tx1 to Tx5 and TxR are also in the connected state, the touch drive signals Pad1 to Pad5 and PadR are also supplied to the drive electrodes Tx1 to Tx5 and TxR.

Accordingly, the touch detection driver 121 can detect contact of an object based on the self capacitance of the drive electrodes TxL, Tx1 to Tx5 and TxR.

As shown in FIG. 11, if the touch detection operation by the self capacitance detection method is executed (that is, the detection method designation signal SELFEN is "1"), the touch drive signal for the mutual capacitance detection method (the drive signal EXVCOM and the drive pulse TSVCOM) is not output.

Further, for example, since the output of the shift register circuit 201 provided for the drive electrode TxL is "0", the output of the inverter 202 is "1". In the execution of the touch detection operation by the self capacitance detection method, the detection method designation signal SELFEN is "1", and thus the output of the inverter 203 is "0". In this case, since the output of the AND circuit 204 is "0", the switch 206 is in the disconnected state. Although the description here focuses on the switch 206 provided for the drive electrode TxL, the same switches provided for the other drive electrodes Tx1 to Tx5 and TxR are also in the disconnected state.

In the execution of the touch detection operation by the self capacitance detection method, the touch drive signal PadN for the self capacitance detection method is supplied to the drive electrodes TxL, Tx1 to Tx5, and TxR as described above.

Although the description here focuses on the touch detection period T8, the same operation as that of the touch detection period T8 will be executed when the touch detection operation by the self capacitance detection method is executed in the touch detection period T9, for example.

As described above, the drive electrodes TxL and TxR (first electrodes) are arranged in such a manner as to overlap the frame area FA in the first substrate 111, and the touch detection electrodes Rx (second electrodes) are arranged in such a manner as to overlap the display area DA in the second substrate 112, in the present embodiment. In the present embodiment, contact or proximity of an object (for example, a finger, etc.) with respect to the frame area FA is detected based on a change in electrostatic capacitance between the drive electrodes TxL and TxR and the touch detection electrodes Rx by outputting (supplying) the touch drive signal to the drive electrodes TxL and TxR.

According to the structure, in contrast to the above-described comparative example of the present embodiment, a flexible printed circuit board for connecting the drive electrodes TxL and TxR and the touch detection driver 121 does not need to be provided in the present embodiment. Therefore, the touch detection function can be realized in the frame area FA and the cost can be reduced in the present embodiment.

Further, contact or proximity of an object with respect to the display area DA is detected based on a change in electrostatic capacitance between the drive electrodes Tx and the touch detection electrodes Rx by outputting (supplying) the touch drive signal to the drive electrodes Tx (third electrodes) arranged in such a manner as to overlap the display area DA in the present embodiment. According to this structure, contact and proximity of an object with the display area DA and the frame area FA can be detected in the present embodiment.

Further, in the present embodiment, the touch detection operation (first detection operation) of detecting contact or proximity of an object based on mutual electrostatic capacitance between the drive electrodes TxL, TxR and Tx and the touch detection electrodes Rx, and the touch detection operation (second detection operation) of detecting contact or proximity of an object based on self electrostatic capacitance of each of the drive electrodes TxL, TxR and Tx are switched to each other. According to this structure, contact or proximity of an object can be detected by an appropriate touch detection operation (the mutual capacitance detection method and the self capacitance detection method).

Figure 12:
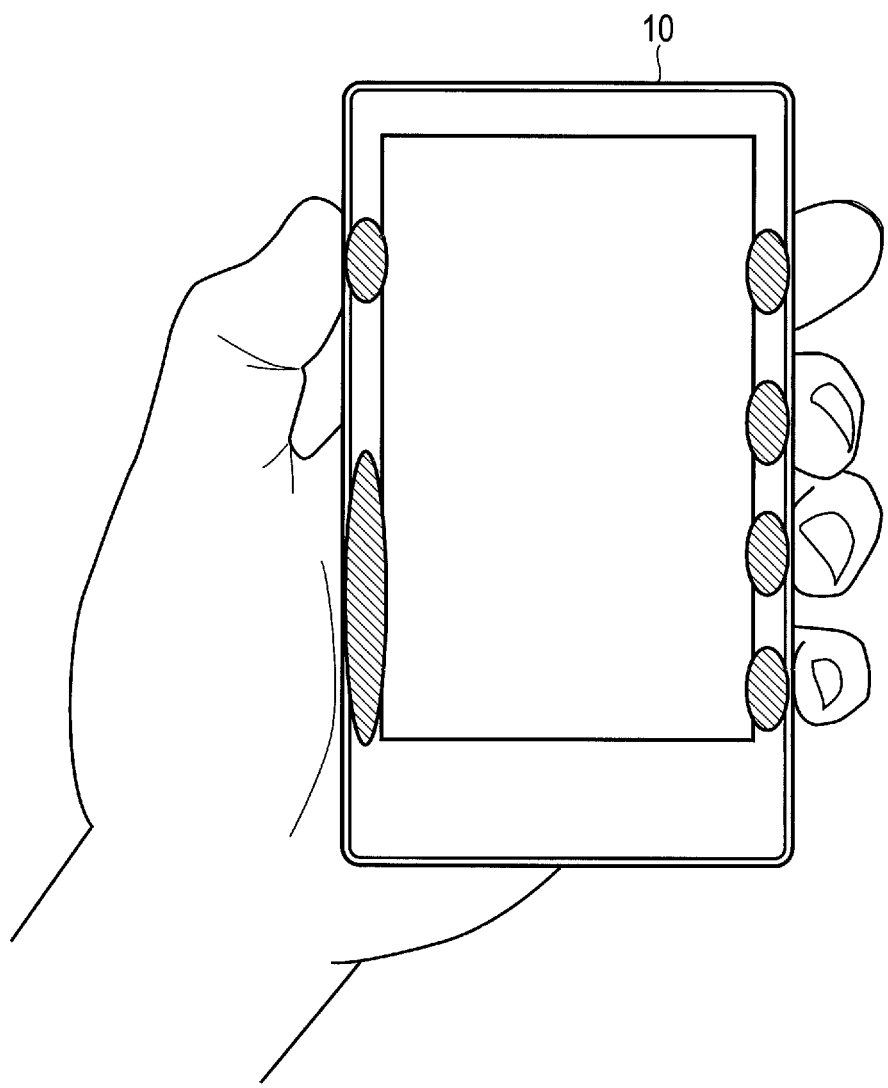
FIG. 12 is a diagram showing the state of a smartphone being held with one hand.

Still further, the touch detection electrodes Rx extend in a direction (first direction) along the short sides (first sides) of the display area DA, and are arranged in a direction (second direction) along the long sides (second sides adjacent to the first sides) of the display area DA in the present embodiment. Still further, the drive electrodes Tx extend in a direction along the long sides of the display area DA and are arranged in a direction along the short sides of the display area DA. Still further, the drive electrodes TxL and TxR extend in a direction along the long sides of the display area DA and face each other across the display area DA in the first substrate 111. According to this structure, contact or proximity of an object with the frame area FA on both sides of the display area DA of the display device 10 such as the smartphone shown in FIG. 5, for example, can be detected in the present embodiment. Accordingly, the state of the smartphone being held with one hand, for example, can be detected based on the contact portions of fingers, etc., in the frame area FA as shown in FIG. 12. Further, in the state of holding the smartphone with the left hand, for example, the user can perform various operations (for example, a shutter operation of a camera, a scrolling operation of a screen, a volume control operation, etc.) by touching or swiping the frame area FA on the left side of the display area DA with the thumb, etc. Note that these operations may be enabled if the state of smartphone being held with one hand is detected.

Still further, for example, the gap between the drive electrode TxR and the drive electrode Tx located at the end on the drive electrode TxR side in the arrangement of the drive electrodes Tx is wider than the gap between the drive electrodes Tx in the present embodiment. More specifically, the drive electrode TxR is arranged such that the drive electrode TxR does not overlap the wires 112a which connect the drive electrodes Tx and the touch detection driver 121. According to this structure, interference of the wires 112a with electric lines of power from the drive electrode TxR to the touch detection electrodes Rx can be prevented, and degradation of the touch detection accuracy can be prevented, accordingly.

Still further, the touch detection electrode RxB, which extends in a direction along the short sides of the display area DA, is arranged along the long sides of the display area DA in the second substrate 112 in the present embodiment. According to this structure, a function such as an input button can be realized below the display area DA of the display device 10, etc., such as the smartphone shown in FIG. 5, for example, without designing and incorporating a separate component, etc. Still further, contact or proximity of an object can also be detected (in the frame area FA) above the display area DA by arranging the touch detection electrode RxU which extends in a direction along the short sides of the display area DA such that the touch detection electrode RxU faces the touch detection electrode RxB across the display area DA in the second substrate 112 in the present embodiment.

Still further, the common electrodes COME for displaying an image in the display area DA are used as the drive electrodes Tx for detecting contact or proximity of an object, and the display operation of displaying an image in the display area DA and the touch detection operation are executed in a time sharing manner, and consequently the thickness of the display device 10 can be reduced and the image quality of the display device 10 can be improved in the present embodiment.

The drive electrodes Tx (common electrodes COME) are assumed to be formed of a transparent conductive material (for example, ITO) in the present embodiment, but the drive electrodes TxL and TxR may be formed of the same material (that is, ITO used for the drive electrodes Tx). Accordingly, the drive electrodes TxL, TxR and Tx can be formed efficiently in the manufacturing process of the display panel 11. Note that the drive electrodes TxL and TxR may also be formed of ITO used for the pixel electrodes, for example.

Figure 13:
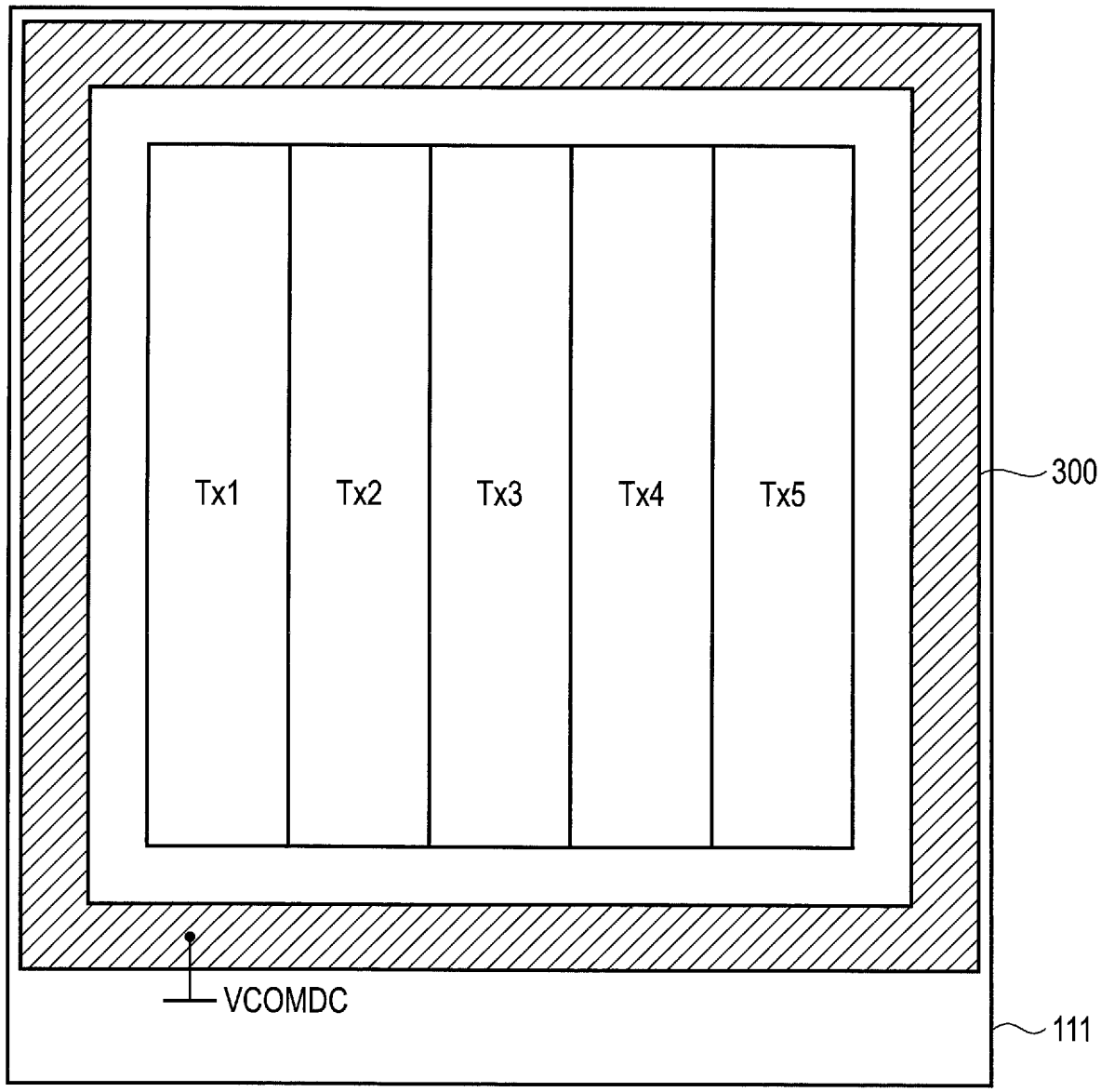
FIG. 13 is a diagram showing an example of a shield electrode formed in a first substrate.

Further, to prevent moisture intrusion or black stain, etc., a shield electrode 300 is formed in such a manner as to surround the drive electrodes Tx in the first substrate 111 as shown in FIG. 13. The shield electrode 300 is formed of ITO, etc., and functions as a shield when the direct-current voltage VCOMDC is supplied. The shield electrode 300 is arranged in a location overlapping the frame area FA.

Figure 14:
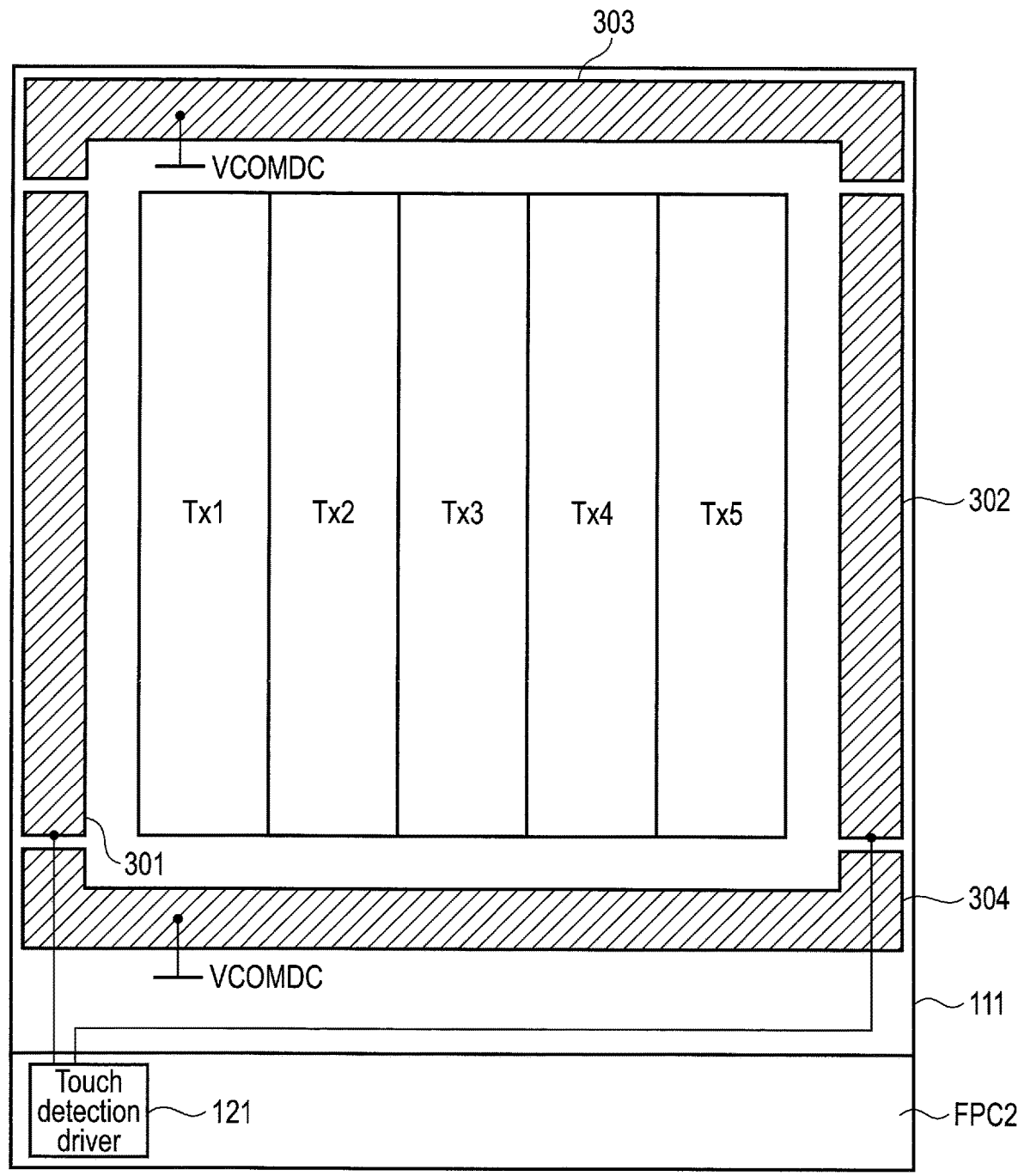
FIG. 14 is an explanatory diagram showing the case of using part of the shield electrode as a drive electrode.

Here, part of the shield electrode 300 shown in FIG. 13 may be used as the drive electrodes TxL and TxR in the present embodiment. More specifically, (part of) the left side 301 of the shield electrode 300 and (part of) the right side 302 of the shield electrode 300 can be used respectively as the drive electrodes TxL and TxR as shown in FIG. 14. In this case, the drive electrodes TxL and TxR are connected to the touch detection driver 121. The direct-current voltage VCOMDC is supplied to parts 303 and 304 of the shield electrode 300 which are not used as the drive electrodes TxL and TxR.

If the drive electrodes TxL and TxR are formed separately from the shield electrode 300, the drive electrodes TxL and TxR may be formed between the shield electrode 300 and the drive electrodes Tx.

Figure 15:
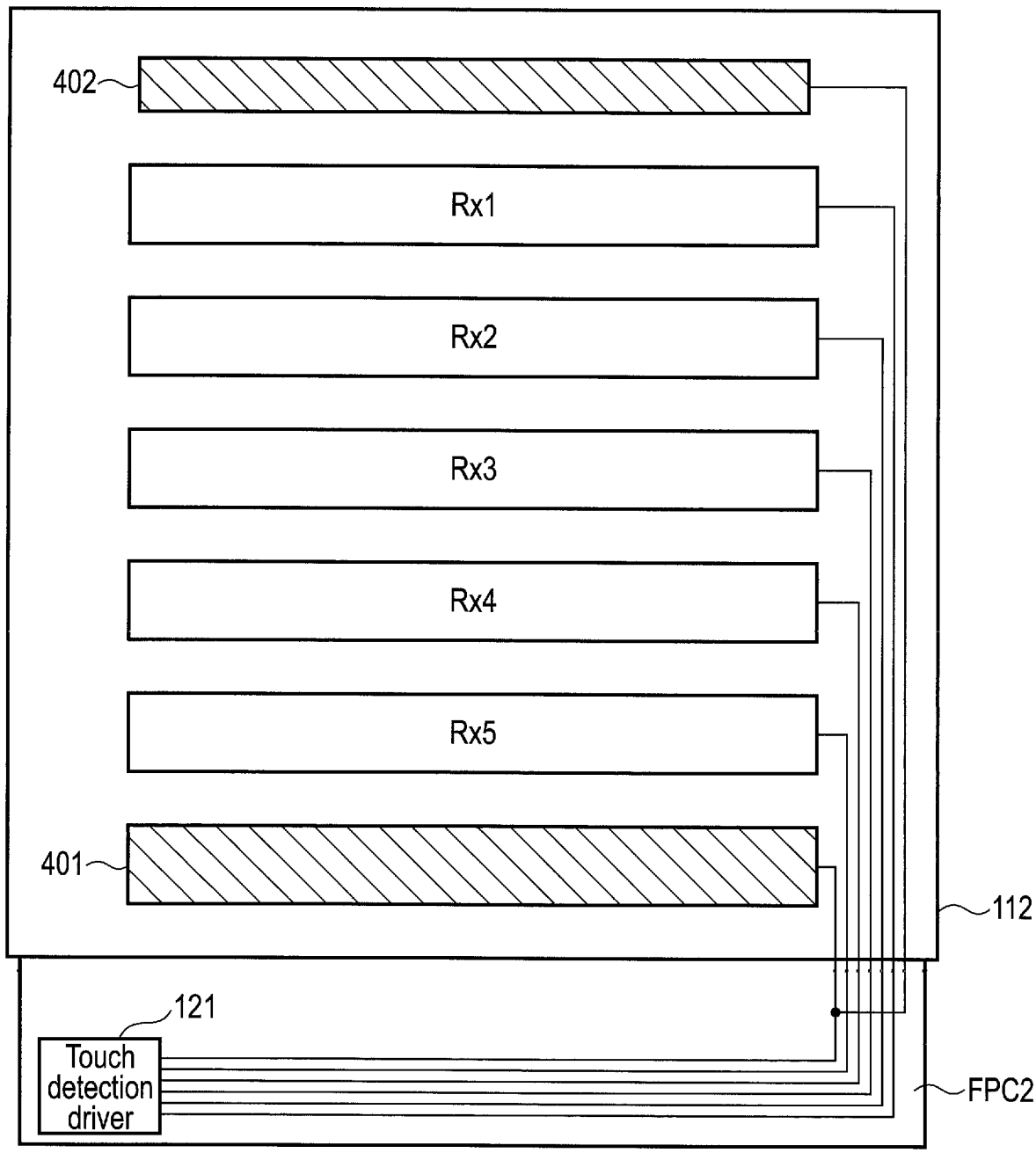
FIG. 15 is a diagram showing an example of a shield electrode formed in a second substrate.

Further, a shield electrode 401 as a shield against noises from circuits (for example, a panel circuit, etc.) arranged in lower layers, and a shield electrode 402 as a countermeasure against static electricity are formed in the second substrate 112 as shown in FIG. 15, for example. The shield electrode 401 is arranged in a location to shield noises resulting from the touch drive signal (drive pulse TSVCOM) output to the drive electrodes TxL, Tx1 to Tx5, and TxR (that is, in a location overlapping wires for supplying the touch drive signal), for example. The shield electrodes 401 and 402 are formed of metal, for example.

Figure 16:
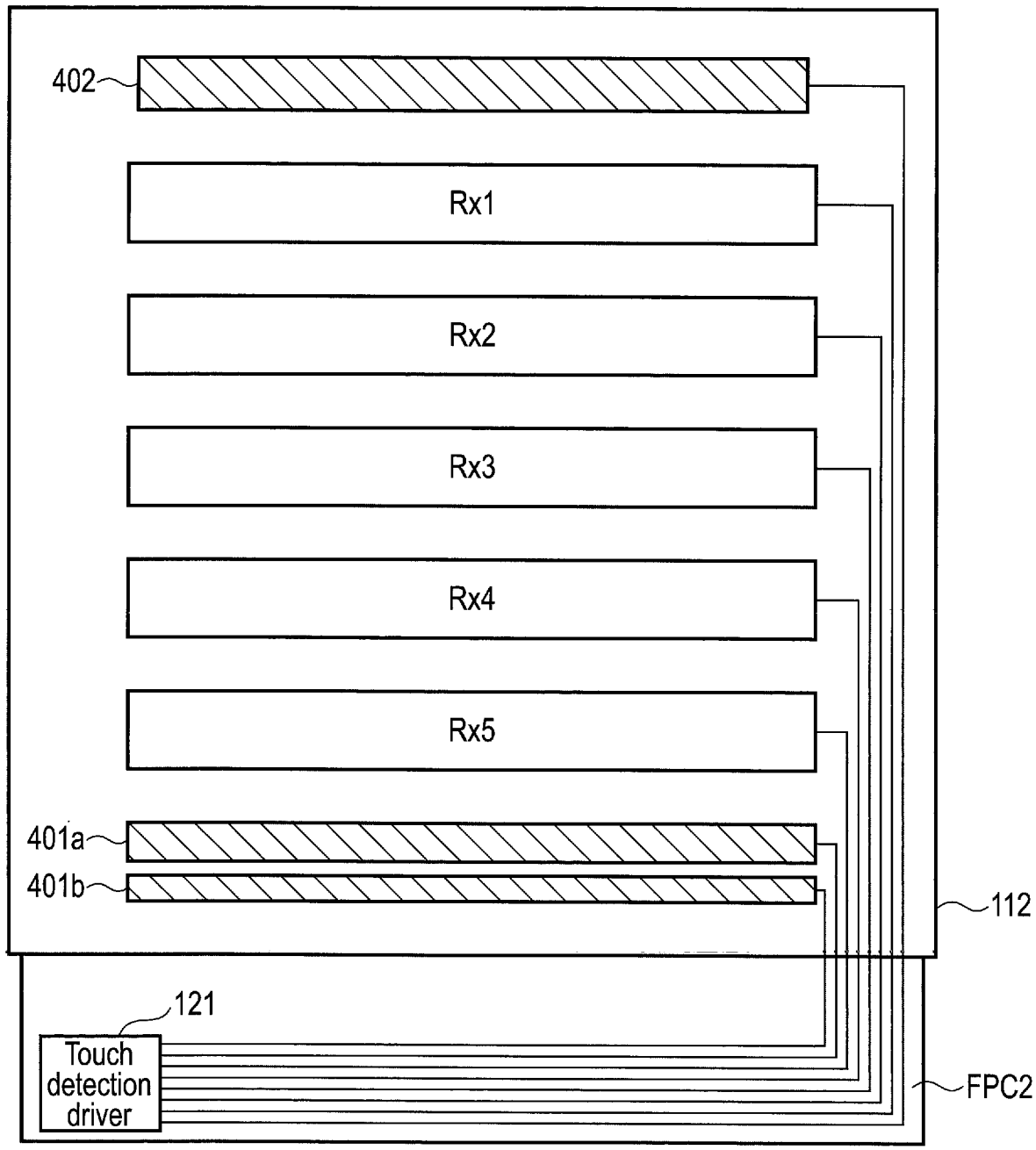
FIG. 16 is an explanatory diagram showing the case of using part of the shield electrode as a touch detection electrode.

Here, the shield electrodes 401 and 402 shown in FIG. 15 may be partially used as the touch detection electrodes RxB and RxU in the present embodiment. More specifically, an upper part 401a of the shield electrode 401 can be used as the touch detection electrode RxB shown in FIG. 16. In this case, a part 401b of the shield electrode 401 which is not used as the touch detection electrode RxB can be used as a shield similarly to the shield electrode 401. On the other hand, since omission of the shield electrode 402 does not have a great impact, the shield electrode 402 may be entirely used as the touch detection electrode RxU as shown in FIG. 16. Alternatively, the shield electrode 402 may be split similarly to the shield electrode 401, and a lower part of the shield electrode 402 may be used as the detection electrode RxU and an upper part of the shield electrode 402 may be used as a shield.

For example, the touch detection electrodes RxB and RxU may be formed of ITO, etc., similarly to the touch detection electrodes Rx.

Although the display device 10 is assumed to have the in-cell touch detection mechanism 12 in the present embodiment, the present embodiment may also be realized as a display device having an on-cell touch detection mechanism, for example.

Further, although the display device 10 is generally described as a smartphone in the present embodiment, the display device according to the present embodiment may be applied to an electronic device having an area corresponding to the frame area, such as a mobile phone, a personal computer, a television receiver, a vehicle-mounted device, a game console or a wearable device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device which displays an image in a display area based on a pixel signal, the display device comprising:
    a first substrate;
    a second substrate opposed to the first substrate;
    a first electrode arranged in the first substrate and overlapping a frame area outside the display area;
    a plurality of second electrodes arranged in the second substrate and overlapping the display area;
    a plurality of third electrodes arranged in the first substrate and overlapping the display area;
    a touch detection driver configured to output a drive signal to the first electrode and the third electrodes, and detect contact or proximity of an object with the frame area based on first electrostatic capacitance between the first electrode and the second electrodes and second electrostatic capacitance between the third electrodes and the second electrodes;
    a plurality of first switches connected to the plurality of third electrodes; and
    a fourth electrode arranged in the second substrate and overlapping the frame area, wherein
    the display area has a rectangular shape,
    the second electrodes are configured to extend in a first direction along first sides of the display area and are arranged in a second direction along second sides adjacent to the first sides,
    the third electrodes are configured to extend in the second direction and are arranged in the first direction,
    the first electrode is configured to extend in the second direction, and two of first electrodes are arranged in the first substrate and face each other across the display area,
    a gap between the first electrode and the third electrode located at an end on a first electrode side in an arrangement of the third electrodes is wider than a gap between adjacent third electrodes in the arrangement of the third electrodes,
    wires which connect the second electrodes and the touch detection driver are arranged in a location overlapping the gap between the first electrode and the third electrode,
    a direct-current voltage is supplied to the plurality of third electrodes via the plurality of first switches when an operation of displaying an image is executed,
    the drive signal is output to the first electrode and the plurality of third electrodes when an operation of detecting contact or proximity of the object is executed,
    the touch detection driver is configured to detect contact or proximity of the object with the frame area based on electrostatic capacitance between the third electrodes and the fourth electrode,
    the fourth electrode is configured to extend in the first direction, and two of fourth electrodes are arranged in the second substrate and face each other across the display area, and
    the first electrodes and the fourth electrodes do not overlap the display area.

2. The display device of claim 1, further comprising a switch configured to switch between a first detection operation and a second detection operation,
    the first detection operation of detecting contact or proximity of the object based on mutual electrostatic capacitance between the first electrode and the third electrodes, and the second electrodes,
    the second detection operation of detecting contact or proximity of the object based on self electrostatic capacitance of each of the first electrode and the third electrodes.

3. The display device of claim 1, wherein the drive signal is sequentially supplied to the first electrode and the third electrodes.

4. The display device of claim 1, wherein the first electrode and the third electrodes are formed of a transparent conductive material.

5. The display device of claim 4, wherein part of a shield electrode arranged in the first substrate is used as the first electrode.

6. The display device of claim 4, wherein the first electrode is arranged between a shield electrode arranged in the first substrate and the third electrodes.

7. The display device of claim 1, wherein part of a shield electrode formed of a metal material and arranged in the second substrate is used as the fourth electrode.

8. The display device of claim 7, wherein the shield electrode is arranged in a location to shield noises resulting from the drive signal output to the first electrode and the third electrodes.

9. The display device of claim 1, wherein a plurality of common electrodes for displaying an image in the display area are used as the third electrodes.

10. The display device of claim 9, wherein a display operation of displaying an image in the display area and a detection operation of detecting contact or proximity of the object are executed in a time sharing manner.

11. The display device of claim 1, further comprising:
    a second switch connected to the first electrode, wherein a constant potential is supplied to the first electrode via the second switch when the operation of displaying an image is executed.

* * * * *